United States Patent
Benham et al.

(10) Patent No.: US 10,040,044 B2
(45) Date of Patent: *Aug. 7, 2018

(54) CONTINUOUS PREPARATION OF CALCINED CHEMICALLY-TREATED SOLID OXIDES

(71) Applicant: Chevron Phillips Chemical Company LP, The Woodlands, TX (US)

(72) Inventors: Elizabeth A. Benham, Spring, TX (US); Max P. McDaniel, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/677,131

(22) Filed: Aug. 15, 2017

(65) Prior Publication Data

US 2017/0341045 A1    Nov. 30, 2017

Related U.S. Application Data

(60) Continuation of application No. 15/018,927, filed on Feb. 9, 2016, now Pat. No. 9,764,297, which is a
(Continued)

(51) Int. Cl.
*B01J 4/00* (2006.01)
*B01J 6/00* (2006.01)
(Continued)

(52) U.S. Cl.
CPC ............. *B01J 6/004* (2013.01); *B01J 8/1827* (2013.01); *B01J 8/1836* (2013.01); *B01J 8/34* (2013.01);
(Continued)

(58) Field of Classification Search
CPC ........ B01J 4/00; B01J 6/00; B01J 6/001; B01J 6/004; B01J 8/00; B01J 8/18;
(Continued)

(56) References Cited

U.S. PATENT DOCUMENTS 3,141,742 A    7/1964  Dye et al.
3,242,099 A    3/1966  Manyik
(Continued)

FOREIGN PATENT DOCUMENTS

CA    1290496    10/1991
GB    727 286     3/1955
(Continued)

OTHER PUBLICATIONS

Hongbo, et al., entitled "Coordination Copolymerization of Severly Encumbered Isoalkenes with Ethylene: Enhanced Enchainment Mediated by Binuclear Catalysts and Cocatalysts," J. Am. Chem. Soc. 2005, 127, pp. 14756-14768.
(Continued)

*Primary Examiner* — Natasha E Young
(74) *Attorney, Agent, or Firm* — Merchant & Gould P.C.

(57) ABSTRACT

The present invention discloses a continuous calcination vessel which can be used to prepare calcined chemically-treated solid oxides from solid oxides and chemically-treated solid oxides. A process for the continuous preparation of calcined chemically-treated solid oxides is also provided. Calcined chemically-treated solid oxides disclosed herein can be used in catalyst compositions for the polymerization of olefins.

20 Claims, 2 Drawing Sheets

Related U.S. Application Data division of application No. 12/489,613, filed on Jun. 23, 2009, now Pat. No. 9,289,739.

(51) Int. Cl.

| | |
|---|---|
| *B01J 8/00* | (2006.01) |
| *B01J 8/18* | (2006.01) |
| *B01J 8/24* | (2006.01) |
| *B01J 8/34* | (2006.01) |
| *B01J 8/36* | (2006.01) |
| *B01J 19/00* | (2006.01) |
| *B01J 19/24* | (2006.01) |
| *B01J 31/00* | (2006.01) |
| *B01J 31/02* | (2006.01) |
| *B01J 31/12* | (2006.01) |
| *B01J 31/14* | (2006.01) |
| *B01J 31/16* | (2006.01) |
| *B01J 31/22* | (2006.01) |

(52) U.S. Cl.
CPC ............. *B01J 8/36* (2013.01); *B01J 31/143* (2013.01); *B01J 31/2295* (2013.01); *B01J 2208/0053* (2013.01); *B01J 2208/0084* (2013.01); *B01J 2208/00176* (2013.01); *B01J 2208/00548* (2013.01); *B01J 2208/00938* (2013.01); *B01J 2219/182* (2013.01); *B01J 2531/48* (2013.01)

(58) Field of Classification Search
CPC ...... B01J 8/1818; B01J 8/1827; B01J 8/1836; B01J 8/1872; B01J 8/24; B01J 8/34; B01J 8/36; B01J 31/00; B01J 31/02; B01J 31/12; B01J 31/14; B01J 31/143; B01J 31/16; B01J 31/22; B01J 31/2282; B01J 31/2295; B01J 2208/00–2208/00017; B01J 2208/00106; B01J 2208/00168; B01J 2208/00176; B01J 2208/00548; B01J 2208/00796; B01J 2208/00823–2208/0084; B01J 2208/00938; B01J 2219/18; B01J 2219/182; B01J 2531/40; B01J 2531/48

See application file for complete search history.

(56) References Cited

U.S. PATENT DOCUMENTS

| | | | |
|---|---|---|---|
| 3,248,179 | A | 4/1966 | Norwood |
| 3,525,590 | A | 8/1970 | Botton |
| 4,022,580 | A | 5/1977 | Rush |
| 4,107,084 | A | 8/1978 | Repik et al. |
| 4,136,061 | A | 1/1979 | Hogan |
| 4,151,122 | A | 4/1979 | McDaniel |
| 4,161,389 | A | 7/1979 | Staffin |
| 4,501,885 | A | 2/1985 | Sherk |
| 4,588,790 | A | 5/1986 | Jenkins |
| 4,794,096 | A | 12/1988 | Ewen |
| 4,808,561 | A | 2/1989 | Welborn |
| 5,169,913 | A | 12/1992 | Staffin |
| 5,218,932 | A | 6/1993 | Abdulally |
| 5,235,009 | A | 8/1993 | Hogan |
| 5,264,196 | A | 11/1993 | Tanaka et al. |
| 5,352,749 | A | 10/1994 | DeChellis |
| 5,378,434 | A | 1/1995 | Staffin et al. |
| 5,436,304 | A | 7/1995 | Griffin |
| 5,455,314 | A | 10/1995 | Burns |
| 5,462,999 | A | 10/1995 | Griffin et al. |
| 5,565,175 | A | 10/1996 | Hottovy |
| 5,575,979 | A | 11/1996 | Hanson |
| 5,576,259 | A | 11/1996 | Hasegawa |
| 5,807,938 | A | 9/1998 | Kaneko |
| 5,866,661 | A | 2/1999 | Benham |
| 5,919,983 | A | 7/1999 | Rosen |
| 6,107,230 | A | 8/2000 | McDaniel |
| 6,144,897 | A | 11/2000 | Selliers |
| 6,144,997 | A | 11/2000 | Lamming |
| 6,165,929 | A | 12/2000 | McDaniel |
| 6,239,235 | B1 | 5/2001 | Hottovy |
| 6,262,191 | B1 | 7/2001 | Hottovy |
| 6,294,494 | B1 | 9/2001 | McDaniel |
| 6,300,271 | B1 | 10/2001 | McDaniel |
| 6,316,553 | B1 | 11/2001 | McDaniel |
| 6,355,594 | B1 | 3/2002 | McDaniel |
| 6,376,415 | B1 | 4/2002 | McDaniel |
| 6,388,017 | B1 | 5/2002 | McDaniel |
| 6,391,816 | B1 | 5/2002 | McDaniel |
| 6,395,666 | B1 | 5/2002 | McDaniel |
| 6,524,987 | B1 | 2/2003 | Collins |
| 6,548,441 | B1 | 4/2003 | McDaniel |
| 6,548,442 | B1 | 4/2003 | McDaniel |
| 6,559,087 | B1 | 5/2003 | De Lange et al. |
| 6,576,583 | B1 | 6/2003 | McDaniel |
| 6,590,131 | B2 | 7/2003 | McGinn |
| 6,613,712 | B1 | 9/2003 | McDaniel |
| 6,632,894 | B1 | 10/2003 | McDaniel |
| 6,667,274 | B1 | 12/2003 | Hawley |
| 6,750,302 | B1 | 6/2004 | McDaniel |
| 6,833,415 | B2 | 12/2004 | Kendrick |
| 6,936,665 | B2 | 8/2005 | Stephens |
| 6,991,767 | B1 | 7/2006 | Staffin |
| 7,179,426 | B2 | 2/2007 | Hottovy |
| 7,247,594 | B2 | 7/2007 | Jayaratne |
| 7,534,842 | B2 | 5/2009 | Jayaratne |
| 7,829,031 | B2 | 11/2010 | Archibald et al. |
| 8,114,353 | B2 | 2/2012 | Benham et al. |
| 8,349,264 | B2 | 1/2013 | Benham et al. |
| 9,289,739 | B2 | 3/2016 | Benham et al. |
| 9,764,297 | B2 | 9/2017 | Benham et al. |
| 2005/0020784 | A1 | 1/2005 | Noll |
| 2005/0192177 | A1 | 9/2005 | Roger |
| 2005/0255987 | A1 | 11/2005 | McDaniel |
| 2007/0060722 | A1 | 3/2007 | Jayaratne et al. |
| 2007/0078238 | A1 | 4/2007 | Burns |
| 2009/0130004 | A1 | 5/2009 | Archibald |
| 2009/0164046 | A1 | 6/2009 | Benham |
| 2010/0290970 | A1 | 11/2010 | Staffin et al. |
| 2013/0109818 | A1 | 5/2013 | Benham et al. |

FOREIGN PATENT DOCUMENTS

| | | |
|---|---|---|
| GB | 2 076 308 | 12/1981 |
| WO | WO 1994/14705 | 7/1994 |
| WO | WO 2009/085104 | 7/2009 |
| WO | WO 2010/151537 | 12/2010 |

OTHER PUBLICATIONS

International Search Report and Written Opinion cited in International Application No. PCT/US2010/039482, dated Sep. 28, 2010, 13 pages.

CONTINUOUS PREPARATION OF CALCINED CHEMICALLY-TREATED SOLID OXIDES

REFERENCE TO RELATED APPLICATIONS

This application is a continuation application of U.S. patent application Ser. No. 15/018,927, filed on Feb. 9, 2016, now U.S. Pat. No. 9,764,297, which is a divisional application of U.S. patent application Ser. No. 12/489,613, filed on Jun. 23, 2009, now U.S. Pat. No. 9,289,739, the disclosures of which are incorporated herein by reference in their entirety.

BACKGROUND OF THE INVENTION

The present invention relates generally to a continuous calcination vessel and to methods for continuously preparing calcined chemically-treated solid oxides. Such calcined chemically-treated solid oxides can be used in catalyst compositions for the polymerization of olefins.

Often, a calcining step is required prior to utilizing a chemically-treated solid oxide in a catalyst composition and, subsequently, in a polymerization process to produce olefin-based polymers. Calcining can be accomplished in a batch process, which typically requires a large vessel which must be cycled from room temperature to temperatures of up to 700° C., and above, for each batch. Additionally, the batch process requires a long time period for heating the vessel and its contents to the desired calcining temperature and, thereafter, cooling down to room temperature. Hence, there exists a need for a calcination vessel and for a method of preparing calcined chemically-treated solid oxides which is more time, energy, and cost efficient. Accordingly, it is to these ends that the present invention is directed.

SUMMARY OF THE INVENTION

A continuous calcination vessel and a catalyst preparation system which includes the calcination vessel are disclosed in an aspect of the present invention. The continuous calcination vessel can comprise:
 (a) a substantially horizontal fluidized bed vessel;
 (b) a particulate material inlet capable of introducing inlet particulate material into the fluidized bed vessel;
 (c) a fluidizing gas inlet capable of introducing a fluidizing gas into the fluidized bed vessel;
 (d) a fluidizing gas path capable of directing the fluidizing gas from the fluidizing gas inlet into the fluidized bed vessel to fluidize the inlet particulate material;
 (e) a heating zone within the fluidized bed vessel;
 (f) an outlet capable of removing outlet particulate material from the fluidized bed vessel.

The present invention also provides a process for continuously preparing a calcined chemically-treated solid oxide. Such a process comprises:
 (a) (i) introducing a solid oxide into a continuous calcination vessel comprising a fluidized bed; and
  contacting the solid oxide with a compound and a first agent at a calcination temperature for an average residence time to produce the calcined chemically-treated solid oxide;
 or
 (ii) introducing a chemically-treated solid oxide into a continuous calcination vessel comprising a fluidized bed; and
  contacting the chemically-treated solid oxide with a first agent at a calcination temperature for an average residence time to produce the calcined chemically-treated solid oxide;
 and
 (b) contacting the calcined chemically-treated solid oxide with a second agent in the continuous calcination vessel, downstream of the continuous calcination vessel, or a combination thereof.

Calcined chemically-treated solid oxides produced by this process can be used in catalyst compositions for the polymerization of olefins, resulting in homopolymers, copolymers, and the like, which can be used to produce various articles of manufacture.

BRIEF DESCRIPTION OF THE FIGURES

The following drawings illustrate only particular aspects representative of the invention and are not intended to limit the scope of the invention.

DEFINITIONS AND ABBREVIATIONS

Figure 1:
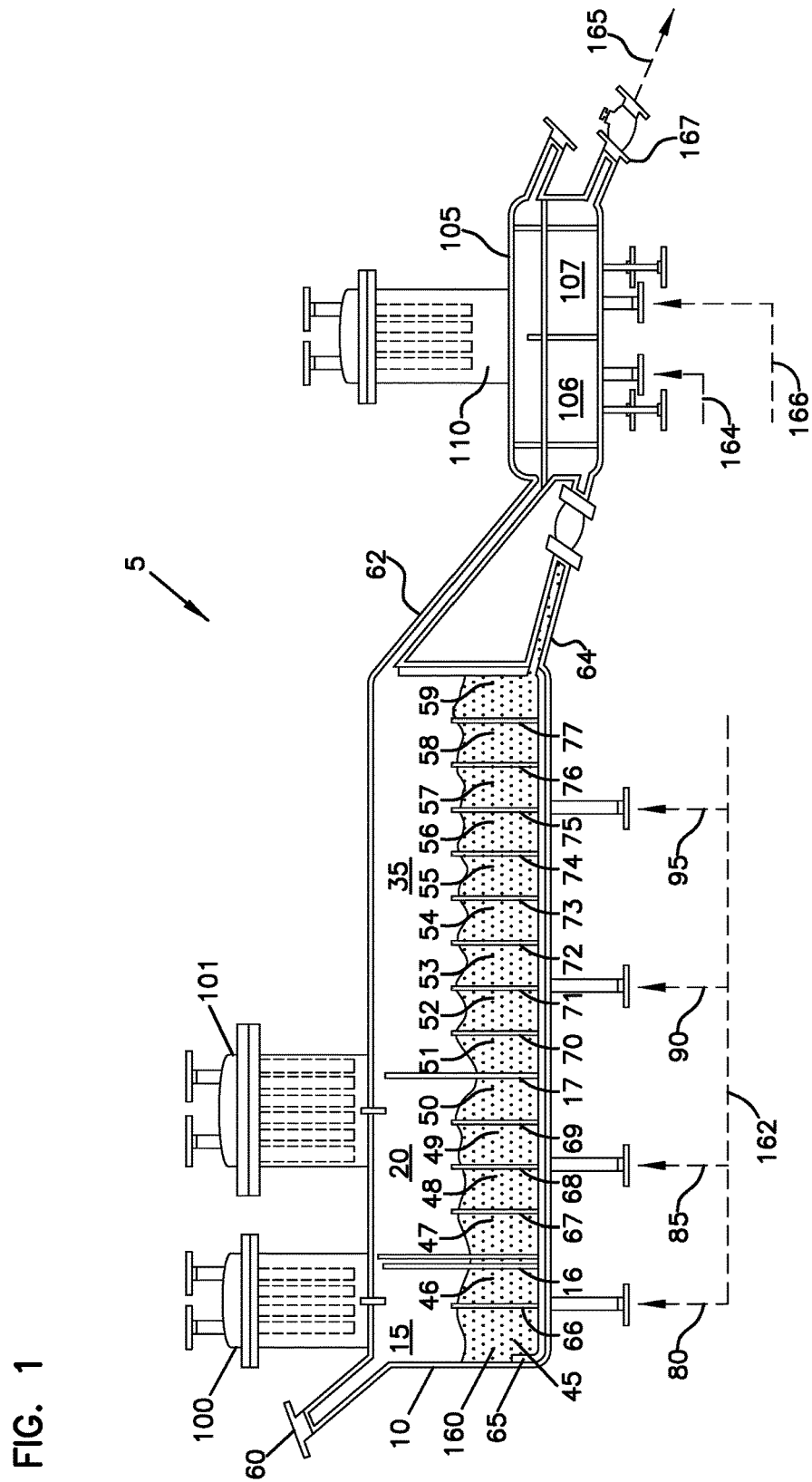
FIG. 1 shows a partial cross-section view of a continuous calcination vessel and a cooling system.

To define more clearly the terms used herein, the following definitions are provided. To the extent that any definition or usage provided by any document incorporated herein by reference conflicts with the definition or usage provided herein, the definition or usage provided herein controls.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer would be categorized an as ethylene/1-hexene copolymer.

In like manner, the scope of the term "polymerization" includes homopolymerization, copolymerization, terpolymerization, etc. Therefore, a copolymerization process would involve contacting one olefin monomer (e.g., ethylene) and one olefin comonomer (e.g., 1-hexene) to produce a copolymer.

The term "co-catalyst" is used generally herein to refer to organoaluminum compounds that can constitute one component of a catalyst composition. Additionally, "co-catalyst" also refers to other optional components of a catalyst composition including, but not limited to, aluminoxanes, organoboron or organoborate compounds, and ionizing ionic compounds, as disclosed herein. The term "co-catalyst" is used regardless of the actual function of the compound or any chemical mechanism by which the compound may operate. In one aspect of this invention, the term "co-catalyst" is used to distinguish that component of the catalyst composition from the metallocene component.

The term "fluoroorgano boron compound" is used herein with its ordinary meaning to refer to neutral compounds of the form $BY_3$. The term "fluoroorgano borate compound" also has its usual meaning to refer to the monoanionic salts of a fluoroorgano boron compound of the form [cation]$^+$ [$BY_4$]$^-$, where Y represents a fluorinated organic group. Materials of these types are generally and collectively referred to as "organoboron or organoborate compounds."

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to the refer to materials which may be blended, mixed, slurried, dissolved, reacted, or otherwise contacted in some other manner. In the fluidizing context, for instance, the "contacting" of two or more components also can comprise the processes of fluidizing, suspending, transporting, conveying, or purging, and the like.

The term "precontacted" mixture is used herein to describe a first mixture of catalyst components that are contacted for a first period of time prior to the first mixture being used to form a "postcontacted" or second mixture of catalyst components that are contacted for a second period of time. Often, the precontacted mixture describes a mixture of metallocene or transition metal compound (or compounds), olefin monomer (or monomers), and organoaluminum compound (or compounds), before this mixture is contacted with a calcined chemically-treated solid oxide(s) and optional additional organoaluminum compound(s). Thus, precontacted describes components that are used to contact each other, but prior to contacting the components in the second, postcontacted mixture. Accordingly, this invention may occasionally distinguish between a component used to prepare the precontacted mixture and that component after the mixture has been prepared. For example, according to this description, it is possible for a precontacted organoaluminum compound, once it is contacted with a metallocene and an olefin monomer, to have reacted to form at least one chemical compound, formulation, or structure different from the distinct organoaluminum compound used to prepare the precontacted mixture. In this case, the precontacted organoaluminum compound or component is described as comprising an organoaluminum compound that was used to prepare the precontacted mixture.

Alternatively, the precontacted mixture can describe a mixture of metallocene or transition metal compound(s) and organoaluminum compound(s), prior to contacting this mixture with the calcined chemically-treated solid oxide(s). This precontacted mixture also can describe a mixture of metallocene compound(s), olefin monomer(s), and calcined chemically-treated solid oxide(s), before this mixture is contacted with an organoaluminum co-catalyst compound or compounds.

Similarly, the term "postcontacted" mixture is used herein to describe a second mixture of catalyst components that are contacted for a second period of time, and one constituent of which is the "precontacted" or first mixture of catalyst components that were contacted for a first period of time. Typically, the term "postcontacted" mixture is used herein to describe the mixture of metallocene or transition metal compound(s), olefin monomer(s), organoaluminum compound(s), and calcined chemically-treated solid oxide(s) formed from contacting the precontacted mixture of a portion of these components with any additional components added to make up the postcontacted mixture. For instance, the additional component added to make up the postcontacted mixture can be a calcined chemically-treated solid oxide, and optionally, can include an organoaluminum compound which is the same as or different from the organoaluminum compound used to prepare the precontacted mixture, as described herein. Accordingly, this invention may also occasionally distinguish between a component used to prepare the postcontacted mixture and that component after the mixture has been prepared.

The term "metallocene," as used herein, describes a compound comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands include hydrogen, therefore the description "substituted derivatives thereof" in this invention comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene compound is referred to simply as the "catalyst," in much the same way the term "co-catalyst" is used herein to refer to, for example, an organoaluminum compound or an aluminoxane compound. Metallocene is also used herein to encompass mono-cyclopentadienyl or half-sandwich compounds, as well as compounds containing at least one cyclodienyl ring and compounds containing boratabenzene ligands. Further, metallocene is also used herein to encompass dinuclear metallocene compounds, i.e., compounds comprising two metallocene moieties linked by a connecting group, such as an alkenyl group resulting from an olefin metathesis reaction or a saturated version resulting from hydrogenation or derivatization.

The terms "catalyst composition," "catalyst mixture," "catalyst system," and the like, do not depend upon the actual product resulting from the contact or reaction of the components of the mixture, the nature of the active catalytic site, or the fate of the co-catalyst, the metallocene or transition metal compound, any olefin monomer used to prepare a precontacted mixture, or the calcined chemically-treated solid oxide, after combining these components. Therefore, the terms "catalyst composition," "catalyst mixture," "catalyst system," and the like, can include both heterogeneous compositions and homogenous compositions.

In this disclosure, the terms "solid oxide," "chemically-treated solid oxide," and "calcined chemically-treated solid oxide," are used as follows. A "solid oxide" refers to an inorganic oxide comprising oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr. By way of example, illustrative solid oxides include silica, alumina, silica-alumina, aluminophosphate, titania, silica-titania, zirconia, silica-zirconia, magnesia, boria, silica-boria, alumina-boria, zinc oxide, zinc-aluminate, and the like. The solid oxide can be either uncalcined or calcined. When the term "chemically-treated solid oxide" is used, it refers to a solid oxide which has been treated with an electron-withdrawing component, typically an anion, but not calcined. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, and the like, including mixtures or combinations thereof. When the "chemically-treated solid oxide" has been calcined, it is referred to as a "calcined chemically-treated solid oxide." Accordingly, non-limiting examples of calcined chemically-treated solid oxides include sulfated or halided silica, alumina, silica-alumina, silica-zirconia, silica-titania, zinc-aluminate, alumina-boria, and the like. For instance, fluorided alumina, chlorided alumina, sulfated alumina, fluorided silica-alumina, chlorided silica-alumina, and sulfated silica-alumina are illustrative calcined chemically-treated solid oxides. Solid oxides, chemically-treated solid oxides, and calcined chemically-treated solid oxides are discussed in greater detail below.

The terms "a," "an," and "the" are intended to include plural alternatives, e.g., at least one, unless otherwise specified. For instance, the disclosure of "a particulate material," "a solid oxide," or "a metallocene compound" is meant to encompass one, mixtures or combinations of more than one, or a plurality, of particulate material, solid oxide, or metallocene compound, respectively. Similarly, the disclosure of "an inlet," "a heating zone," or "a baffle" is meant to encompass one or more than one, inlet, heating zone, or baffle, respectively.

Although any methods, devices, systems, and materials similar or equivalent to those described herein can be used in the practice or testing of the invention, the typical methods, devices, systems, and materials are herein described. Additionally, while methods, devices, systems, and compositions are described in terms of "comprising" various components or steps, the methods, devices, systems, and compositions also can "consist essentially of" or "consist of" the various components or steps. For example, a catalyst composition of the present invention can comprise, or alternatively, can consist essentially of, a contact product of (i) a metallocene or transition metal compound; (ii) an organoaluminum compound; and (iii) a calcined chemically-treated solid oxide prepared in accordance with this disclosure.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

For any particular compound disclosed herein, any structure presented also encompasses all conformational isomers, regioisomers, and stereoisomers that may arise from a particular set of substituents. The structure also encompasses all enantiomers, diastereomers, and other optical isomers whether in enantiomeric or racemic forms, as well as mixtures of stereoisomers, as would be recognized by a skilled artisan.

Applicants disclose several types of ranges in the present invention. These include, but are not limited to, a range of number of atoms, a range of weight ratios, a range of molar ratios, a range of temperatures, a range of times, a range of surface areas, a range of pore volumes, a range of particle sizes, and so forth. When Applicants disclose or claim a range of any type, Applicants' intent is to disclose or claim individually each possible number that such a range could reasonably encompass, including end points of the range as well as any sub-ranges and combinations of sub-ranges encompassed therein. For example, by a disclosure that the calcination temperature is within a range from about 300° C. to about 1000° C., Applicants intend to recite that the temperature can be selected from about 300° C., about 325° C., about 350° C., about 375° C., about 400° C., about 425° C., about 450° C., about 475° C., about 500° C., about 525° C., about 550° C., about 575° C., about 600° C., about 625° C., about 650° C., about 675° C., about 700° C., about 725° C., about 750° C., about 775° C., about 800° C., about 825° C., about 850° C., about 875° C., about 900° C., about 925° C., about 950° C., about 975° C., and about 1000° C. Additionally, the calcination temperature can be within any range from about 300° C. to about 1000° C. (for example, the calcination temperature is in a range from about 500° C. to about 700° C.), and this also includes any combination of sub-ranges between about 300° C. and about 1000° C. Likewise, all other ranges disclosed herein should be interpreted in a manner similar to this example.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

DETAILED DESCRIPTION OF THE INVENTION

The following description refers to the accompanying drawings. Wherever possible, the same reference numbers are used in the drawings and the following description to refer to the same or similar elements. While various aspects of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following description does not limit the invention.

Continuous Calcination Vessel

A continuous calcination vessel in accordance with the present invention can comprise:
 (a) a substantially horizontal fluidized bed vessel;
 (b) a particulate material inlet capable of introducing inlet particulate material into the fluidized bed vessel;
 (c) a fluidizing gas inlet capable of introducing a fluidizing gas into the fluidized bed vessel;
 (d) a fluidizing gas path capable of directing the fluidizing gas from the fluidizing gas inlet into the fluidized bed vessel to fluidize the inlet particulate material;
 (e) a heating zone within the fluidized bed vessel;
 (f) an outlet capable of removing outlet particulate material from the fluidized bed vessel.

The continuous calcination vessel can be used, for example, as a vessel for drying particulate material (such as solid oxides), calcining particulate material (such as solid oxides or chemically-treated solid oxides), chemically treating solid oxides, and/or producing calcined chemically-treated solid oxides.

A representative continuous calcination vessel is illustrated in FIG. 1. The continuous calcination vessel 5 can comprise a substantially horizontal fluidized bed vessel 10 that allows for fluidization of particulate material 160, so that the particulate material 160 behaves "fluid-like" and can be transported through the vessel without mechanical means. The fluidized bed vessel 10 is described as "substantially horizontal," which means that the slope from horizontal of the vessel, the slope of one zone to another zone, or the slope of the plurality of zones, is less than about 15 degrees from horizontal, either upward or downward. For instance, the slope can be less than about 10 degrees or, alternatively, less than about 5 degrees from horizontal. The continuous calcination vessel 5 can be designed to have any suitable orientation, and is not limited by physical arrangements or orientations of the vessel and zones, including the size and shape of the various structures comprising the vessel and zones, or any of the apertures comprising any of the structures of the continuous calcination vessel 5. The fluidized bed vessel 10 can comprise a gas distributor plate 65; a particulate material inlet 60; at least one outlet 62, 64; a plurality of heating zones 15, 20, 35; at least one zone dividing wall 16, 17; a plurality of baffles 66-77; and a means for independently controlling the temperature of each heating zone. The continuous calcination vessel 5 may have a final outlet 167.

The gas distributor plate 65 is one example of a fluidizing gas inlet capable of introducing a fluidizing gas into the fluidized bed vessel 10. The fluidizing gas inlet for introducing a fluidizing gas can be any design capable of producing a uniform and efficient distribution of the fluidizing gas 162 throughout the fluidized bed vessel 10. Suitable examples of fluidizing gas inlets capable of introducing a fluidizing gas can include, but are not limited to, distributor plates, nozzles, holes, screens, dispensing heads, and the like, or combinations thereof. For example, the fluidizing gas inlet can include a plurality of small diameter holes drilled through the bottom of the vessel 10, a metal screen, a sieve mesh, a porous sintered metal, a porous sintered ceramic material, or a plurality of screw-cap dispensing heads, as long as such materials allow passage of the fluidizing gas 162 throughout the vessel 10 for fluidizing the particulate material.

The gas distributor plate 65 maintains fluidization conditions throughout the vessel 10 so that the particulate material is transported between the various zones and stages. The particulate material inlet 60 can be used for introducing the particulate material 160 into the vessel 10. In one aspect, the gas distributor plate 65 can be installed in the vessel 10 so that the gas distributor plate slopes to aid in the movement of the particulate material 160 through the zones and stages, although this is not a requirement. Extending upwardly from the gas distributor plate is a fluidizing gas path, which is capable of directing the fluidizing gas from the fluidizing gas inlet into the fluidized bed vessel to fluidize particulate material disposed above the gas distributor plate and throughout the fluidized bed vessel.

At least one zone dividing wall 16, 17 may divide the vessel 10 into a plurality of heating zones 15, 20, 35. The zone dividing walls 16, 17 substantially seal a particular zone from the adjacent zone. The zone dividing walls extend substantially perpendicular to, above, and below the gas distributor plate 65. At least one of the zone dividing walls 16, 17 may contain a zone dividing wall opening that allows the particulate material to be introduced into a next downstream zone. In some aspects, a heating zone may not require a baffle, while in other aspects, each heating zone may contain one or more baffles 66-77. The baffles define stages 45-59 within a heating zone and, often, there are at least two stages in a heating zone. Typically, each heating zone comprises a lower boundary that comprises at least a portion of the gas distributor plate. The vessel 10 can comprise any suitable number of stages, such as from about 2 stages to about 75 stages; alternatively, from about 4 stages to about 50 stages; alternatively, from about 10 stages to about 20 stages; or alternatively, about 12 to about 15 stages. In one aspect, the particulate material 160 travels through all of the stages 45-59 contained within the vessel 10 prior to being discharged from the vessel. The residence time can vary among the various heating zones 15, 20, 35. In some aspects, the residence time decreases from the third heating zone 35 to the second heating zone 20 to the first heating zone 15. When the residence time increases from the first heating zone 15 to the second heating zone 20 to the third heating zone 35, the particulate material may be subjected to progressively higher temperatures as it is transported through the vessel 10.

The vessel 10 can contain one, or more than one, heating zone. In the exemplary vessel illustrated in FIG. 1, there are three zones 15, 20, 35. The first zone 15 can contain from 1 and 15 stages; alternatively, from 1 and 5 stages; or alternatively, from 1 to 3 stages. The second zone 20 can contain from 1 to 20 stages; alternatively, from 2 to 8 stages; or alternatively, from 3 to 7 stages. The third zone 35 can contain from 1 to 50 stages; alternatively, from 5 to 15 stages; or alternatively, from 8 to 12 stages. Accordingly, each heating zone can contain a different number of stages within the respective zone. For example, zone 15 can include two stages, zone 20 can include four stages, and zone 35 can include nine stages.

Each stage 45-59 can act substantially as a continuous stirred-tank reactor (CSTR) within the vessel 10. The multistage configuration provides a narrow residence time distribution of the fluidized particulate material 160 in the vessel 10. As the number of stages increases, the residence time distribution function of the particulate material within each zone changes from a broad exponentially decaying function to a substantially plug flow distribution, with all particulate material having a substantially equal residence time in each heating zone.

Each baffle 66-77 may contain a plurality of apertures to allow the particulate material 160 to flow through each stage by fluidized horizontal flow while the fluidizing gas 162 and the particulate material are in contact with one another. The apertures can be located on alternating opposite edges of the baffles to create a serpentine flow profile. A serpentine flow profile can help control the residence time distribution of the particulate material through the vessel 10. The movement of the particulate material through the serpentine flow profile approaches substantially plug flow, and helps prevents short-circuiting or bypassing of the particulate material through the vessel, so that each particulate experiences a residence time which is similar to the that of the average residence time.

A bottom portion of each heating zone may be defined by at least a portion of the gas distributor plate 65. If the fluidizing gas inlet is a plurality of screw-cap dispensing heads, at least a portion of the screw-cap dispensing heads can introduce the fluidizing gas 162 into each zone of the fluidized bed vessel 10. There can be one or more outlets 62, 64 capable of removing outlet particulate material from the fluidized bed vessel 10. Additional components of the continuous calcination vessel 5 can be present, and are described below.

The temperature of each heating zone 15, 20, 35 can be maintained independently. Particulate material 160 passing through the vessel 10 can be subjected to step-wise progressively higher temperatures in the zones 15, 20, 35. Such a temperature profile can replace, and is an improvement over, the long temperature ramp-up time used in a conventional batch calcination, the result being a substantial reduction in the time needed to prepare calcined chemically-treated solid oxides.

Other process parameters, such as residence time, can be controlled. For example, the average residence time for the particulate material 160 to progress through the entire fluidized bed vessel 10 can be controlled by adjusting the feed rate of the particulate material to the particulate material inlet 60 of the vessel.

In one aspect, each heating zone is continuously in operation with respect to the flow of particulate material through the inlet and outlet of the zone. The zone dividing walls 16, 17 can be used to substantially separate a particular zone from an adjacent zone.

In another aspect, the continuous calcination vessel 5 can comprises a plurality of gas lines 80, 85, 90, 95 that supply the gas distributing plate 65 with the fluidizing gas 162. Alternatively, if screw-cap dispensing heads are present, then the plurality of gas lines can supply the fluidizing gas through the screw-cap dispensing heads. The fluidizing gas may reach the fluid bed vessel 10 by traveling through the gas distributor plate. The plurality of gas lines 80, 85, 90, 95 are capable of permitting independent selection of a fluidizing gas for each heating zone 15, 20, 35. Hence, each zone can be fluidized with the same or a different fluidizing gas. For instance, the fluidizing gas in one or more zones can comprise at least one first agent (and optionally include at least one compound), while the fluidizing gas in one or more other downstream zones can comprise at least one second agent. The first agent, second agent, and compound will be discussed further below. The flexibility to select different temperatures and different types of fluidizing gases within each respective zone enables the continuous calcination vessel 5 to utilize, for example, either solid oxides or chemically-treated solid oxides an the inlet particulate material, and yet still produce calcined chemically-treated solid oxides as the outlet particulate material 165.

In some aspects of this invention the continuous calcination vessel 5 can comprise a filter apparatus to capture entrapped or entrained particles and return them to the fluidized bed. Such an apparatus can remove a portion of the inlet particulate material and/or the outlet particulate material which is entrained in the fluidizing gas. This is particularly useful when the particulate material contains fine particles (fines), or when the fluidization velocity is high. Filters may be of any type suitable for this purpose, including, but not limited to, bag filters made of woven fiber, filters of sintered metal, or ceramic filters, and the like. These filters often comprise "blow-back" capabilities in which the gas flow can be temporarily reversed to knock off accumulated particulate material from the filter elements. These filters may be external to the vessel 10 or internal. Non-limiting external variants include bag filters that exist in separate locations and are connected by piping to the vessel 10. In this aspect, fines are captured and then can be discarded, or can be returned to any part of the vessel 10. Alternatively, the filters may be of the sintered metal or ceramic types and can be located in compartments positioned immediately above the vessel. In this aspect, fines falling off the filter elements drop back into the fluidized bed. In another aspect, the filters can be positioned internally within the vessel, so that fines falling off the filter elements drop directly back into the bed at substantially the same location from which they came. Filters can be oriented vertically or horizontally. When the filter elements are positioned internally, they can be oriented horizontally along the top of the vessel. Horizontal placement can allow all zones in the vessel to be covered equally by the same filter element(s). This arrangement can minimize or stop horizontal air flow between zones and thus can minimize the fines traveling between the zones. For example, the continuous calcination vessel 5 can include a filter apparatus 100, 101, 110 that is adapted to remove from the calcination vessel particulate material 160 entrained in the fluidizing gas 162. For instance, employing the filter apparatus 100, 101 can return substantially all of the entrained particulate material back to the fluidized bed vessel 10, enabling more of the particulate material 160 to be calcined. In this aspect, substantially none of the particulate material is lost overhead, i.e., less than 1% by weight of the material in the fluidized bed vessel 10.

In some aspects, filter apparatus 100, 101 can be provided above zones 15, 20, respectively, to catch particulate material and return this material to the fluidized bed. In other aspects, within each filter is a plurality of gas permeable filter elements that can be alternated between filtration and blow-back, according to a predetermined cycle, to maintain continuous and efficient filtration performance. The filters can be designed to filter any size particles, including particles in the 1 to 5 micron size range, and below. The size of the filters can be designed to accommodate the desired air velocity and pressure constraints of the fluidizing process. Additionally, the filters can be sized and shaped so that the filtered particulate material falls back into the fluidized bed and not onto horizontal or slanted walls where it could stick. The filtering step can comprise any suitable filtering or separation procedure. This invention is not limited to any particular type or method of filtering, filtration, separation, or related particulate removal process, as well as re-injection into the process. For example, a separation process might comprise a cyclone, an operation with some cyclonic force, or other suitable system.

The filters 100, 101 can be positioned so that the airflow above the stages enables the filtered particles to be sent back to the same or an upstream location from where the particles were removed. In this configuration, the particles entrained from one stage cannot be filtered and discharged into a later, downstream stage in the vessel. Such an arrangement prevents short-circuiting of the particulate material 160 through the vessel 10. Generally, entrained particles are sent back to the same stage from which they were removed, or an earlier, upstream stage. For instance, the filters can be arranged so that each filter discharges its captured particles back into the same zone from which the particles originated.

The continuous calcination vessel 5 also can comprise a cooling system 105 downstream of an outlet 62, 64 of the fluidized bed vessel 10. The cooling system can include a filter apparatus 110. The cooling system can include one or more stages, for example, an initial stage 106 and a final stage 107. In some aspects of this invention, the initial stage and the final stage can be used to cool and/or purge the calcined chemically-treated solid oxide with at least one inert agent 164, 166, which can be selected independently.

Selections for the inert agent will be discussed in greater detail below. In another aspect, however, the vessel 10 can contain a cooling zone in addition to the one or more heating zones. This cooling zone can reduce the temperature of the calcined chemically-treated solid oxide to a temperature below the calcination temperature prior to the discharge of this particulate material from the vessel 10.

Figure 2:
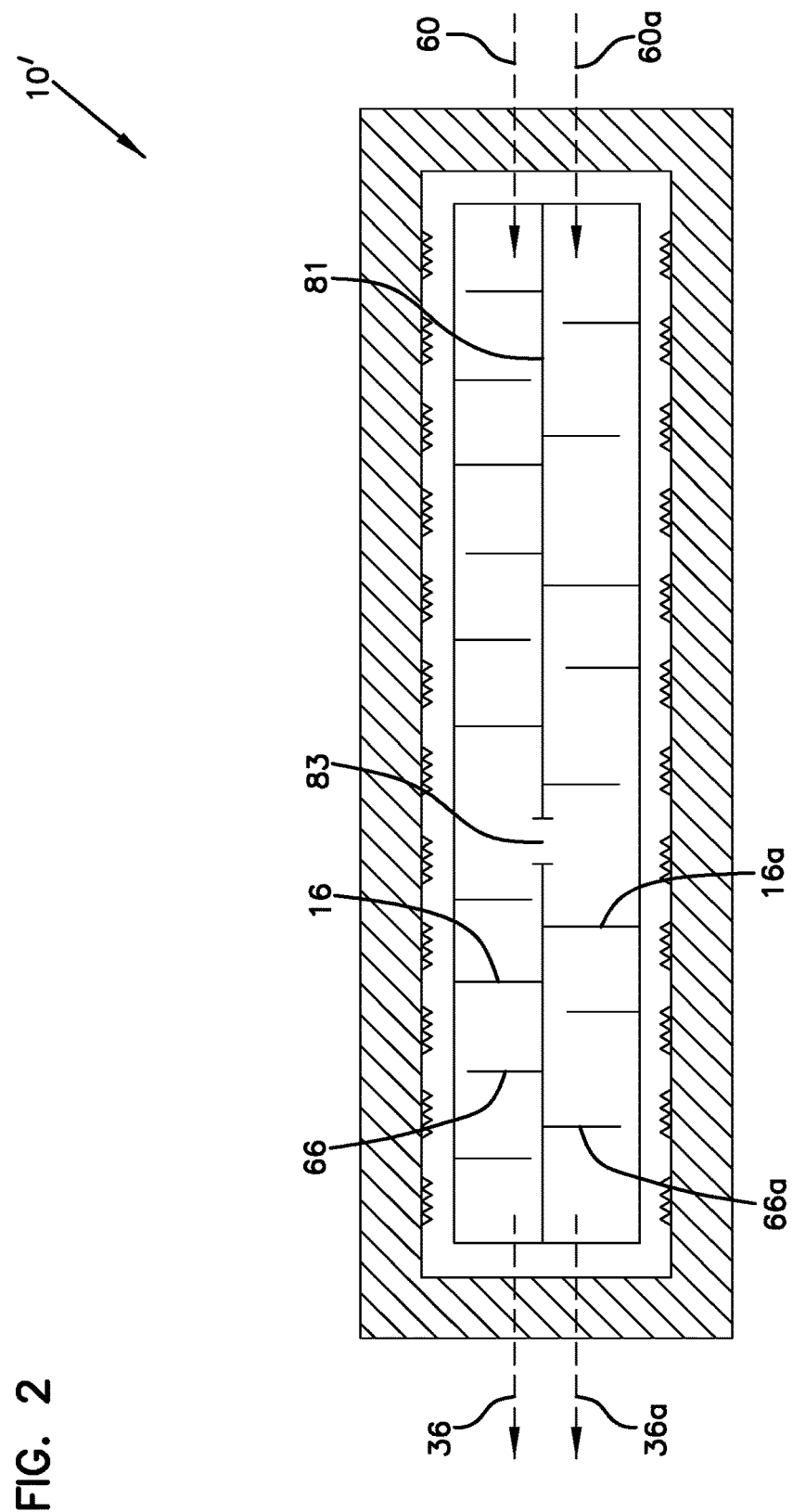
FIG. 2 shows a multiple chamber continuous calcination vessel.

As illustrated in FIG. 2, more than one type of particulate material can be calcined at a time, or simultaneously, in the continuous calcination vessel. For example, the calcination vessel can comprise a chamber dividing wall 81 which substantially isolates two chambers within a multi-chambered fluidized bed vessel 10'. In this aspect, two different inlet feed streams 60, 60a of particulate material enter the multi-chambered fluidized bed vessel 10' and are calcined in two separate chambers. Each chamber can include the same equipment as in the single chamber fluidized bed vessel 10 described above. For example, each chamber can include baffles 66, 66a and zone dividing walls 16, 16a. When more than one type of particulate material is being calcined at a time, the exiting particle streams 36, 36a can be blended after exiting the fluidized bed of the multi-chambered fluidized bed vessel. A blend port 83 can be included within the multi-chambered fluidized bed to allow the different particles to mix or blend within the multi-chambered fluidized bed. There are various possibilities for a multi-chambered vessel. For example, the vessel could produce two or more different calcined chemically-treated solid oxides simultaneously. In one aspect, these calcined chemically-treated solid oxides (e.g., fluorided alumina and sulfated alumina) could be produced and blended for use in combination in a catalyst system. Alternatively, two types of calcined chemically-treated solid oxides can be produced simultaneously, but maintained separate. One can envision that such flexibility could lead to two distinct supply streams for two different catalyst systems, resulting in lower capital investment and energy usage costs.

It is contemplated that the continuous calcination vessel can be used to produce calcined chemically-treated solid oxides for use in various catalyst systems. The following description provides one method of producing a calcined chemically-treated solid oxide in a continuous calcination vessel 5, as exemplified in FIG. 1. In this method, particulate material 160 enters the fluidized bed vessel 10 through a particulate material inlet 60. The inlet particulate material can comprise solid oxides, chemically-treated solid oxides, or combinations of these materials. Once the particulate material 160 is in the vessel 10, the particulate material is fluidized with a fluidizing gas 162 such that the particles can be transported throughout the vessel without requiring mechanical means. The particulate material is heated to a calcination temperature for an average residence time. Following calcination, the particulate material—which can comprise a calcined chemically-treated solid oxide—exits the vessel 10 through outlets 62, 64, and is cooled in a downstream cooling system 105. The particles then exit through a final outlet 167 of the calcination vessel 5. Typically, the outlet particulate material 165 comprises a calcined chemically-treated solid oxide. Additional information on solid oxides, chemically-treated solid oxides, and calcined chemically-treated solid oxides is provided below.

In one aspect, the continuous calcination vessel 5 contains two or more heating zones 15, 20, 35. The continuous calcination vessel can comprise at least one zone dividing wall for dividing the fluidized bed vessel into the at least two heating zones, and at least one of the zone dividing walls can comprise at least one zone dividing wall opening that allows the particulate material to be introduced into a next downstream zone, where the at least two heating zones are located substantially horizontal in relation to one another. As provided above, substantially horizontal means that the slope from horizontal of one zone to another zone is less than about 15 degrees from horizontal, either upward or downward. More often, the slope can be less than about 10 degrees or, alternatively, less than about 5 degrees from horizontal.

If the vessel comprises at least one zone dividing wall and at least two heating zones, the fluidizing gas 162 in the first heating zone can comprise air, nitrogen, argon, hydrogen, oxygen, carbon monoxide, water, or combinations or mixtures thereof. The fluidizing gas 162 in the second heating zone can comprise helium, neon, argon, nitrogen, or combinations of these materials. If desired, the fluidizing gas 162 can be preheated prior to entering the vessel.

Several operating parameters of the calcination vessel can be adjusted to obtain different production rates of the calcined chemically-treated solid oxide and/or different catalyst system activity (e.g., grams of polyethylene produced per hour per gram of calcined chemically-treated solid oxide). Among these are the velocity of the fluidizing gas 162, the average residence time, the calcination temperature and temperature profile, the number of heating zones, the selection of fluidizing gases, the inlet feed rate of the solid oxide or chemically-treated solid oxide, and the like. As an example, the inlet feed rate to the calcination vessel can range from about 10 lb/hr to about 200 lb/hr, from about 15 lb/hr to about 100 lb/hr, from about 20 lb/hr to about 70 lb/hr, or from about 25 lb/hr to about 50 lb/hr. The output from the calcination vessel, or portions of the output, can be fed directly to a catalyst preparation system, pre-contacted with one or more other components of a catalyst system, or fed into a storage tank for later use in a catalyst system. It is also contemplated that the some or all of the output calcined chemically-treated solid oxide can be fed directly into a polymerization reactor.

The calcination temperature within the vessel generally is within a range from about 300° C. to about 1000° C. That is, the temperature within each heating zone 15, 20, 35 typically is controlled at a temperature within a range from about 300° C. to about 1000° C. The temperature of each heating zone can be set at a temperature that is the same as or different from the temperature of any of the other heating zones. In the three-heating zone vessel depicted in FIG. 1, exemplary calcination temperatures in the heating zones 15, 20, 35 can be as follows. The heating first zone 15 can be controlled at a temperature in a range from about 300° C. to about 700° C.; or alternatively, from about 400° C. to about 600° C. The second zone 20 can be controlled at a temperature in a range from about 400° C. to about 900° C.; alternatively, from about 450° C. to about 850° C.; or alternatively, from about 500° C. to about 700° C. The third zone 35 can be controlled at a temperature in a range from about 450° C. to about 900° C.; alternatively, from about 500° C. to about 850° C.; or alternatively, from about 500° C. to about 750° C. As noted above, the temperature in each heating zone also can be controlled at the same temperature. Other suitable temperature profiles will be apparent to those of skill in the art and are to be considered within the scope of the present invention.

Various heating sources can be used for the calcination vessel. In some aspects, the heat source is electrical heating. Alternatively, natural gas heating can be employed. Other suitable heating sources other than these can be used and fall within the scope of the present invention. The continuous calcination vessel has an advantage of using less energy than batch calcination devices because the batch process requires significant cycling of the temperature during the heating and cooling steps, from room temperature to the calcination temperature, and then back down to room temperature. It is also expected that continuous calcination can be accomplished is a smaller vessel than that employed in a batch operation. Further, since the preparation of the calcined chemically-treated solid oxide can be continuous, the output can be discharged directly to a polymerization reactor, a catalyst preparation system vessel, or a storage tank. Hence, the cooling step may take place downstream of the heated vessel, thereby eliminating the cool down step that is necessary for manual handling in the batch system.

The average residence time of the particulate material 160 in the vessel 10 typically is within a range from about 5 minutes to about 24 hours. In one aspect, the average residence time is from about 10 minutes to about 8 hours. In another aspect, the average residence time is from about 10 minutes to about 6 hours. Yet, in another aspect, the average residence time is from about 15 minutes to about 3 hours. The average residence time is the average time it takes a particle to travel from the inlet 60 of the vessel to the exit of the heated fluidized bed vessel 10, not including any time in a downstream cooling system 105, or other downstream device. It is understood that there will be a distribution of residence times, but that this distribution of residence time will be relatively narrow. For example, in some aspects of this invention, there are sufficient baffles 66-77 in the vessel 10 to effect a substantially plug flow profile in the vessel. By substantially plug flow, it is meant that no more than 25% of the particles, by weight, will have a residence time less than the average residence time. For instance, less than about 20%, or alternatively, less than about 15%, of the particles may have a residence time less than the average residence time in some aspects of this invention.

In aspects having more than one heating zone, the total average residence time in the vessel can be spread across the plurality of zones by holding the particulate material 160 for different times within the plurality of zones. For example, in a two-zone vessel, the particulate material 160 can be held within a first zone for an average residence time of about 2 minutes to about 12 hours; or alternatively, from about 3 minutes to about 5 hours; or alternatively, from about 4 minutes to about 3 hours. The residence time in a second zone also can be from about 2 minutes to about 12 hours; or alternatively, from about 3 minutes to about 5 hours; or alternatively, from about 4 minutes to about 3 hours. Various process and dimensional parameters can affect the residence time in a particular heating zone, such as, for example, the particle feed rate, fluidizing gas velocity, dimensions of the vessel, number of heating zones, number and dimensions of baffles, dimensions of zone dividing walls, and so forth. For instance, the fluidizing gas 162 can be supplied at a linear velocity that ranges from about 0.05 ft/sec to about 1 ft/sec. In one aspect of the present invention, the linear velocity of the fluidizing gas is in a range from about 0.1 ft/sec to about 0.8 ft/sec, or from about 0.1 ft/sec to about 0.7 ft/sec. In another aspect, the linear velocity of the fluidizing gas is in a range from about 0.1 ft/sec to about 0.5 ft/sec or, alternatively, from about 0.15 ft/sec to about 0.35 ft/sec.

The average bulk density of particulate material that can be effectively processed in the continuous calcination vessel 5 generally is within a range from about 0.1 g/mL to about 0.8 g/mL. For instance, particulates with average bulk densities in a range from about 0.2 g/mL to about 0.7 g/mL, or from about 0.2 g/mL to about 0.5 g/mL, are often used.

Average particle sizes range typically from about 20 microns up to about 500 microns; alternatively, from about 30 microns to about 200 microns; alternatively, from about 40 microns to about 150 microns; alternatively, from about 50 microns to about 150 microns; or alternatively, from about 50 microns to about 100 microns. For instance, in one aspect, the average particle size is in a range from about 40 microns to about 100 microns, and less than about 10% of the particles by weight have a particle size less than about 20 microns. It is expected that the calcination vessel 5 is not limited to any specific bulk density or particle size range, nor to particle shape or morphology, so long as the particulate material is capable of being adequately fluidized in the fluidized bed vessel 10.

Because the continuous processes and equipment described herein are more efficient at the same throughput than comparable batch processes and equipment, it is believed that smaller vessels and accompanying equipment can be used at the same or greater overall production capacity, which reduces the initial capital investment required to install and operate such systems. Because the continuous calcination vessel is not subjected to heating and cooling cycles in the same manner as that of a batch calcinator, it is expected that the mechanical integrity, longevity, and life-time of the continuous calcination vessel will be superior to the of a comparable batch calcinator. Furthermore, less cycling of the heating and cooling steps in the continuous calcination process results in the utilization of less energy.

Calcined Chemically Treated Solid Oxides

A calcined chemically-treated solid oxide can be a solid oxide which has been chemically-treated with an electron-withdrawing anion and calcined. The solid oxide can be chemically-treated first, and then calcined, or chemically-treated and calcined simultaneously, to produce the calcined chemically-treated solid oxide. Generally, the calcined chemically-treated solid oxide contains Brønsted or Lewis acid groups, exhibiting enhanced acidity as compared to the corresponding untreated solid oxide. The present invention discloses processes for continuously preparing such calcined chemically-treated solid oxides, where the starting material can be either a solid oxide or a chemically-treated solid oxide.

With a solid oxide starting material, a process for continuously preparing a calcined chemically-treated solid oxide can comprise:

introducing a solid oxide into a continuous calcination vessel comprising a fluidized bed;

contacting the solid oxide with a compound and a first agent at a calcination temperature for an average residence time to produce the calcined chemically-treated solid oxide; and contacting the calcined chemically-treated solid oxide with a second agent in the continuous calcination vessel, downstream of the continuous calcination vessel, or a combination thereof.

Alternatively, calcined chemically-treated solid oxides can be prepared continuously from chemically-treated solid oxides. In this aspect, the process can comprise:

introducing a chemically-treated solid oxide into a continuous calcination vessel comprising a fluidized bed;

contacting the chemically-treated solid oxide with a first agent at a calcination temperature for an average residence time to produce the calcined chemically-treated solid oxide; and contacting the calcined chemically-treated solid oxide with a second agent in the continuous calcination vessel, downstream of the continuous calcination vessel, or a combination thereof.

In either of these processes, the calcined chemically-treated solid oxide can be prepared in a continuous calcination vessel, which can be the continuous calcination vessel described above or illustrated in FIGS. 1-2, but it is not limited thereto. Any vessel or apparatus which can perform continuous calcination and comprises a fluidized bed can be employed and realize the benefits of these processes for continuously preparing calcined chemically-treated solid oxides. This invention also encompasses calcined chemically-treated solid oxides prepared by any of the processes disclosed herein.

A solid oxide can be described as an inorganic oxide comprising oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr, or combinations thereof. Examples of solid oxides that can be employed to produce calcined chemically-treated solid oxides include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. Suitable solid oxides encompasses oxide materials such as alumina, "mixed oxide" materials thereof such as silica-alumina, and combinations or mixtures thereof. The mixed oxide materials—for example, silica-alumina—can be single or multiple chemical phases with more than one metal combined with oxygen to form a solid oxide. Illustrative and non-limiting mixed oxides that can be used to form calcined chemically-treated solid oxides of the present invention include silica-alumina, silica-titania, silica-zirconia, alumina-titania, alumina-zirconia, zinc-aluminate, and the like, and combinations of these materials.

In one aspect of the present invention, the solid oxide introduced into the continuous calcination vessel comprises silica, alumina, silica-alumina, aluminophosphate, titania, zirconia, magnesia, boria, zinc oxide, a mixed oxide thereof, or any combination thereof. In another aspect, the solid oxide comprises silica, alumina, silica-alumina, aluminophosphate, titania, silica-titania, zirconia, silica-zirconia, magnesia, boria, silica-boria, alumina-boria, zinc oxide, zinc-aluminate, or combinations thereof. Yet, in another aspect, the solid oxide comprises silica, alumina, silica-alumina, or a combination thereof. For instance, the solid oxide can be alumina, or alternatively, can be silica-alumina.

If silica-alumina is employed as the solid oxide, it typically has an alumina content from about 5 to about 95% by weight. According to one aspect of this invention, the alumina content of the silica-alumina is from about 5 to about 50%, or from about 8% to about 30%, alumina by weight. In another aspect, high alumina content silica-aluminas can be employed, in which the alumina content of these silica-aluminas typically ranges from about 60% to about 90%, or from about 65% to about 80%, alumina by weight.

The solid oxide can be either uncalcined or calcined prior to chemical-treatment and either concurrent or subsequent calcining. Generally, solid oxides employed herein have a pore volume greater than about 0.1 mL/g. For example, the solid oxide can have a pore volume greater than about 0.5 mL/g; alternatively, a pore volume greater than about 0.75 mL/g; or alternatively, a pore volume greater than about 1 mL/g. In one aspect, the pore volume of the solid oxide falls within a range from about 0.8 mL/g to about 1.8 mL/g, such as, for example, from about 1 mL/g to about 1.6 mL/g.

In some aspects, the solid oxide has a surface area of from about 100 to about 1000 $m^2/g$. Often, the solid oxide has a surface area of from about 150 to about 800 $m^2/g$. Yet, in some aspects, the solid oxide has a surface area of from about 200 to about 600 $m^2/g$, or from about 250 to about 500 $m^2/g$.

The solid oxides disclosed herein generally have average particle sizes ranging from about 5 microns to about 150 microns. In some aspects of this invention, the average particle size falls within a range from about 30 microns to about 100 microns. For example, the average particle size of the solid oxide can be in a range from about 40 microns to about 80 microns.

At least one compound is contacted with the solid oxide, and the at least one compound is often an electron-withdrawing anion source compound. Examples of electron-withdrawing anions in this compound can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof. Alternatively, the anion can be a halogen, sulfate, $BF_4$, $SiF_6$, $TiF_6$, $ZrF_6$, or $PF_6$. In some aspects, the anion is fluoride, chloride, or sulfate.

An electron-withdrawing anion source compound can increase the Lewis or Brønsted acidity of the solid oxide upon treatment, as compared to the solid oxide that is not treated with an electron-withdrawing anion. The electron-withdrawing anion source compound serves as a source or a precursor for the respective anion. The compound, for example, an electron-withdrawing anion source compound that serves as a source or a precursor for the respective anion, can comprise one or more of the following: $SO_3$, ammonium sulfate, sulfuric acid, $F_2$, $BF_3$, hydrogen fluoride, silicon tetrafluoride, titanium tetrafluoride, perfluorohexane, perfluorobenzene, fluoromethane, trifluoroethanol, $Cl_2$, hydrogen chloride, carbon tetrachloride, perchlorobenzene, chloromethane, dichloromethane, chloroform, trichloroethanol, a freon, and the like. Mixtures or combinations of these anion source compounds are contemplated and encompassed herein. For instance, two or more electron-withdrawing source compounds can be contacted with the solid oxide simultaneously or individually, such as, for example, contacting two or more electron-withdrawing anion source compounds in two or more separate contacting steps.

The electron-withdrawing anion source compound typically is volatile or gaseous at the intended calcination temperature. Accordingly, these compounds can be combined with a gas stream containing a first agent—to be discussed further below—to fluidize and contact the solid oxide, generally resulting in simultaneous chemical treatment and calcination.

Instead of a solid oxide, alternatively, a chemically-treated solid oxide can be introduced into a continuous calcination vessel to prepare a calcined chemically-treated solid oxide. A chemically-treated solid oxide refers to a solid oxide which has been treated with a compound, such as an electron-withdrawing anion source compound, but not calcined. Representative chemically-treated solid oxides that can be employed in the present invention include, but are not limited to, fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, and the like, or combinations thereof.

The chemically-treated solid oxide can comprise a contact product of at least one solid oxide and at least one electron-withdrawing anion source compound. It is not required that the solid oxide be calcined prior to contacting the electron-withdrawing anion source compound. That is, the solid oxide can be calcined or uncalcined. Various methods can be used to form chemically-treated solid oxides useful in the present invention. Such methods are described in U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, and 6,750,302, the disclosures of which are incorporated herein by reference in their entirety.

For instance, a fluorided solid oxide can be formed by contacting a solid oxide with a fluoriding agent. The fluoride ion can be added to the oxide by forming a slurry of the oxide in a suitable solvent such as alcohol or water including, but not limited to, the one to three carbon alcohols because of their volatility and low surface tension. Examples of suitable fluoriding agents can include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), hexafluorotitanic acid ($H_2TiF_6$), ammonium hexafluorotitanic acid (($NH_4)_2TiF_6$), hexafluorozirconic acid ($H_2ZrF_6$), analogs thereof, and combinations thereof. For example, ammonium bifluoride $NH_4HF_2$ can be used as the fluoriding agent, due to its ease of use and availability.

Similarly, a chlorided solid oxide can be formed by contacting a solid oxide with a chloriding agent. The chloride ion can be added to the oxide by forming a slurry of the oxide in a suitable solvent. In like manner, a sulfated solid oxide can be formed by contacting a solid oxide (e.g., alumina, silica-alumina, etc.) with a sulfate source, for example, sulfuric acid or a sulfate salt such as ammonium sulfate. This process is generally performed by forming a slurry of the solid oxide in a suitable solvent, such as alcohol or water, in which the desired concentration of the sulfating agent has been added. Suitable organic solvents can include, as noted above, the one to three carbon alcohols because of their volatility and low surface tension.

The amount of fluoride or chloride ion present before entering the calcination vessel generally is from about 2 to about 50% by weight, where the weight percent is based on the weight of the solid oxide, for example, silica-alumina, before contacting with the respective fluoride or chloride compound. According to another aspect of this invention, the amount of fluoride or chloride ion present is from about 3 to about 25% by weight, and according to another aspect of this invention, from about 4 to about 20% by weight. Once impregnated with a halide, the halided solid oxide can be dried by any suitable method including, but not limited to, suction filtration followed by evaporation, drying under vacuum, spray drying, and the like, although it is also possible to enter the calcining vessel without drying the chemically-treated solid oxide.

The amount of sulfate ion present before entering the calcination vessel generally is from about 0.5 to about 100 parts by weight sulfate ion to about 100 parts by weight solid oxide. According to another aspect of this invention, the amount of sulfate ion is from about 1 to about 50 parts by weight sulfate ion to about 100 parts by weight solid oxide, and according to still another aspect of this invention, from about 5 to about 30 parts by weight sulfate ion to about 100 parts by weight solid oxide. These weight ratios are based on the weight of the solid oxide before contacting with the respective sulfate compound. Once impregnated with sulfate, the sulfated solid oxide can be dried in the same manner as the halided solid oxides, or can enter the calcining vessel without drying the chemically-treated solid oxide.

The calcined chemically-treated solid oxide can be prepared in the continuous calcination vessel as a result of calcining a chemically-treated solid oxide, or chemically-treating and concurrently calcining a solid oxide. Non-limiting examples of calcined chemically-treated solid oxides prepared in this manner can include sulfated silica, alumina, silica-alumina, silica-zirconia, silica-titania, zinc-aluminate, alumina-boria, and the like, or combinations thereof. Likewise, additional examples of calcined chemically-treated solid oxides which can be prepared in this manner can include halided silica, alumina, silica-alumina, silica-zirconia, silica-titania, zinc-aluminate, alumina-boria, and the like, or combinations thereof. Often, the halide employed is fluoride or chloride.

In accordance with one aspect of the present invention, the calcined chemically-treated solid oxide comprises fluorided alumina, chlorided alumina, sulfated alumina, fluorided silica-alumina, chlorided silica-alumina, sulfated silica-alumina, or any combination thereof. In another aspect, the calcined chemically-treated solid oxide comprises fluorided silica-alumina. In yet another aspect, the calcined chemically-treated solid oxide comprises sulfated alumina.

Calcined chemically-treated solid oxides produced by the above processes function as a catalyst activator as compared to the corresponding untreated solid oxide. While the calcined chemically-treated solid oxide can activate a metallocene or transition metal compound in the absence of co-catalysts, it is not necessary to eliminate co-catalysts from a catalyst composition. The activation function of the calcined chemically-treated solid oxide is evident in the enhanced activity of the catalyst composition as a whole, as compared to a catalyst composition containing the corresponding untreated solid oxide. However, it is believed that the calcined chemically-treated solid oxide can function as an activator, even in the absence of organoaluminum compounds, aluminoxanes, organoboron or organoborate compounds, ionizing ionic compounds, and the like.

In the processes for preparing calcined chemically-treated solid oxides, a first agent is contacted with the solid oxide and/or the chemically-treated solid oxide. This first agent contacts the respective oxide and fluidizes or suspends the respective oxide particles in the fluidized bed. The first agent can be considered a calcining agent which provides the desired atmosphere for calcining the respective oxide particles, and this atmosphere can be an oxidizing atmosphere, a reducing atmosphere, or an inert atmosphere, for example. It is contemplated that the first agent can comprise air, nitrogen, argon, hydrogen, oxygen, carbon monoxide, water, or a combination of more than one of these materials. For instance, the first agent can comprise oxygen; alternatively, the first agent can comprise nitrogen; or alternatively, the first agent can comprise air and water (i.e., moist or humid air).

When the input to the continuous calcination vessel is a chemically-treated solid oxide, the first agent can act as the fluidizing and calcining medium while the chemically-treated solid oxide is calcined and converted to a calcined chemically-treated solid oxide. When the input to the continuous calcination vessel is a solid oxide, the first agent can act as the fluidizing medium, calcining medium, and a carrier for the compound (e.g., an electron-withdrawing anion source compound and/or its anion), while the solid oxide is chemically-treated, calcined, and converted to an calcined chemically-treated solid oxide.

The continuous preparation of calcined chemically-treated solid oxides is performed at a calcination temperature for an average residence time. The solid oxide and/or the chemically-treated solid oxide are contacted with the first agent at a calcination temperature which is generally within a range from about 300° C. to about 1000° C., for an average residence time ranging from about 5 minutes to about 24 hours. In some aspects of this invention, the calcining temperature is in a range from about 350° C. to about 900° C., from about 400° C. to about 800° C., or from about 500° C. to about 700° C. The average residence time can be in a range from about 5 minutes to about 20 hours, from about 5 minutes to about 12 hours, from about 10 minutes to about 8 hours, from about 10 minutes to about 6 hours, or from about 15 minutes to about 3 hours, in other aspects of this invention. Thus, for example, the calcining can be carried out for an average residence time of from about 15 minutes to about 3 hours at a calcination temperature of from about 500° C. to about 700° C. As noted above, the atmosphere employed during calcining is determined largely by the composition of the first agent, e.g., an oxidizing atmosphere, a reducing atmosphere, or an inert atmosphere.

In the processes for preparing a calcined chemically-treated solid oxide, the calcined chemically-treated solid oxide can be contacted with a second agent in the continuous calcination vessel, downstream of the calcination vessel, or a combination thereof. If the second agent is contacted with the calcined chemically-treated solid oxide in the fluidized bed vessel, this second agent contacts the calcined chemically-treated solid oxide and fluidizes or suspends the calcined chemically-treated solid oxide particles in the fluidized bed. The second agent can be considered to act as a purging agent which provides an inert atmosphere and partially or completely removes oxygen, moisture, and/or other materials—which can be poisons in a subsequent catalyst system and polymerization process—from the calcined chemically-treated solid oxide particles. In addition, or alternatively, the second agent can contact the calcined chemically-treated solid oxide in a cooling system downstream of the fluidized bed vessel. In this aspect, the second agent can serve as both a cooling medium and a purging agent. Also, the second agent can contact the calcined chemically-treated solid oxide in a mixing device (e.g., a static mixer), a tote vessel, a holding or storage tank, or in similar equipment, downstream of the calcination vessel. It is contemplated that the second agent can be contacted with the calcined chemically-treated solid oxide in one or more than one piece of equipment. The second agent generally comprises an inert gas, such as helium, neon, argon, or nitrogen, or combinations of more than one of these materials. In some aspects of this invention, the first agent and the second agent are the same. For instance, nitrogen can be used as both the first agent and the second agent.

In accordance with one aspect of this invention, contacting the calcined chemically-treated solid oxide with the second agent reduces a residual oxygen content of the calcined chemically-treated solid oxide to less than about 500 ppm, a residual moisture content of the calcined chemically-treated solid oxide to less than about 500 ppm, or both. In another aspect, the contacting or purging of the calcined chemically-treated solid oxide with the second agent reduces the residual oxygen content of the calcined chemically-treated solid oxide to less than about 250 ppm, or to less than about 100 ppm, and/or reduces the residual moisture content of the calcined chemically-treated solid oxide to less than about 250 ppm, or to less than about 100 ppm. In yet another aspect, the residual oxygen and/or moisture content can be reduced to level within a range from about 1 ppm to about 150 ppm, from about 1 ppm to about 100 ppm, or from about 1 ppm to about 50 ppm. This contacting or purging step with the second agent generally can be conducted in a time period ranging from about 2 minutes to about 24 hours, or more if needed. Often, the contact or purging time is in a range from about 5 minutes to about 20 hours, from about 5 minutes to about 12 hours, or from about 5 minutes to about 10 hours. Thus, for example, the contact or purging time can be within a range from about 5 minutes to about 5 hours, or from about 5 minutes to about 2 hours.

The process for preparing calcined chemically-treated solid oxides can further comprise a cooling step. The cooling step can be accomplished by cooling the calcined chemically-treated solid oxide particles in the presence of an inert agent, typically in a cooling system downstream of the fluidized bed. The inert agent can be helium, neon, argon, or nitrogen, or combinations thereof. The inert agent can be the same as, or different from, the second agent. For instance, nitrogen can be the second agent (e.g., a purging agent) as well as the inert agent, which can act as a cooling medium for the calcined chemically-treated solid oxide.

A filtration system can be employed as part of the continuous calcination vessel, as depicted in FIG. 1. As it pertains to the process for preparing calcined chemically-treated solid oxides, this process can further comprise a filtration step. Such a step can comprise recycling a filtered portion of the solid oxide, the chemically-treated solid oxide, and/or the calcined chemically-treated solid oxide back to the same or an upstream location in the continuous calcination vessel, wherein substantially none of the respective solid oxide, chemically-treated solid oxide and/or calcined chemically-treated solid oxide is lost overhead. As noted above, "substantially none" in this context means that less than 1% by weight of the particulate material contained within the vessel is lost overhead.

Once prepared, the calcined chemically-treated solid oxides generally have a pore volume greater than about 0.1 mL/g. For example, the calcined chemically-treated solid oxide can have a pore volume greater than about 0.5 mL/g; alternatively, a pore volume greater than about 0.75 mL/g; or alternatively, a pore volume greater than about 1 mL/g. In some aspects, the pore volume of the calcined chemically-treated solid oxide falls within a range from about 0.8 mL/g to about 1.8 mL/g, such as, for example, from about 1 mL/g to about 1.6 mL/g.

In accordance with another aspect of this invention, the calcined chemically-treated solid oxide has a surface area of from about 100 to about 1000 m$^2$/g. More often, the calcined chemically-treated solid oxide has a surface area of from about 150 to about 800 m$^2$/g. Yet, the calcined chemically-treated solid oxide can have a surface area of from about 200 to about 600 m$^2$/g, or from about 250 to about 500 m$^2$/g, in some aspects of this invention.

The calcined chemically-treated solid oxides generally have average particle sizes ranging from about 5 microns to about 150 microns. In some aspects, the average particle size falls within a range from about 20 microns to about 150 microns, or from about 30 microns to about 100 microns. For example, the average particle size of the calcined chemically-treated solid oxides can be in a range from about 40 microns to about 80 microns.

Resultant calcined chemically-treated solid oxides can be combined with a metallocene or transition metal compound and an organoaluminum compound to form a catalyst composition, which subsequently can be used in the polymerization of olefins.

Transition Metal or Metallocene Compounds

The calcined chemically-treated solid oxides produced in accordance with the present invention can be employed in a catalyst composition with one or more transition metal compounds, with one or more metallocene compounds, or combinations thereof. Generally, there is no limitation on the selection of the transition metal or metallocene compound, or compounds, that can be used in combination with the calcined chemically-treated solid oxides disclosed herein. For instance, transition metal compounds disclosed in U.S. Pat. Nos. 7,247,594 and 7,534,842, which are incorporated herein by reference in their entirety, can be used with the calcined chemically-treated solid oxides of this invention. Often, in a metallocene compound, the transition metal is Ti, Zr, or Hf Some examples of suitable ansa-metallocene compounds include, but are not limited to:

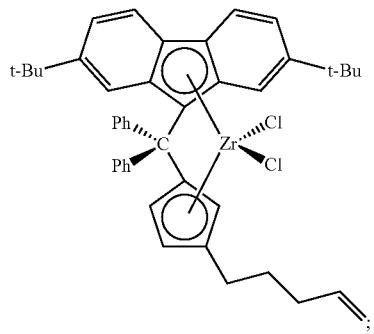

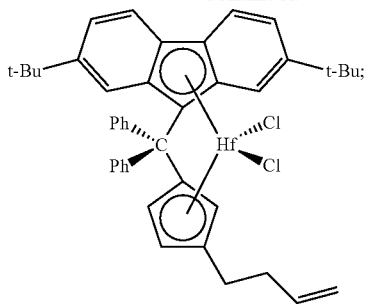

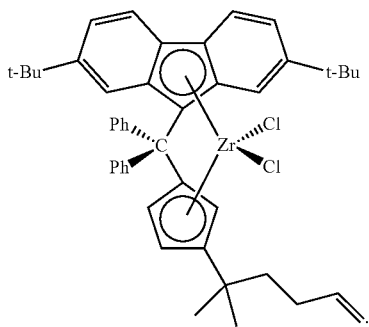

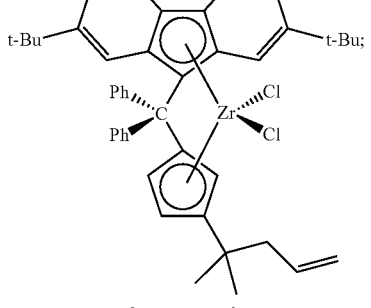

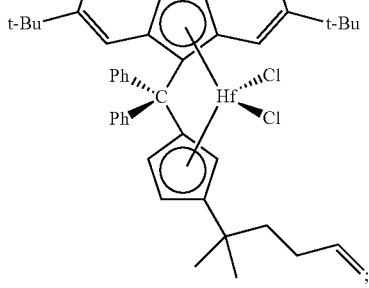

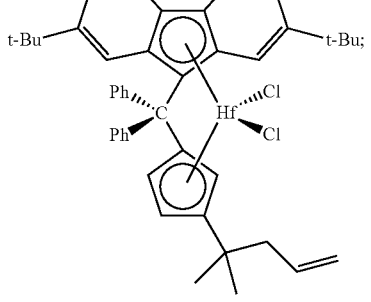

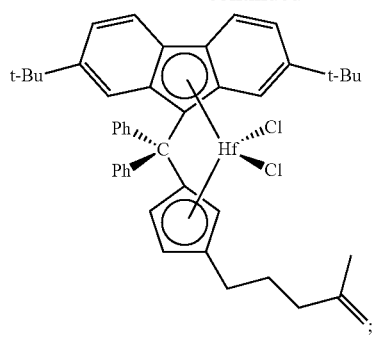
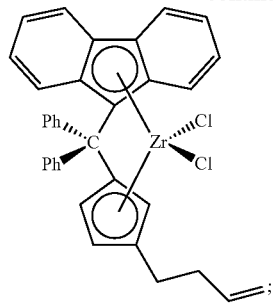
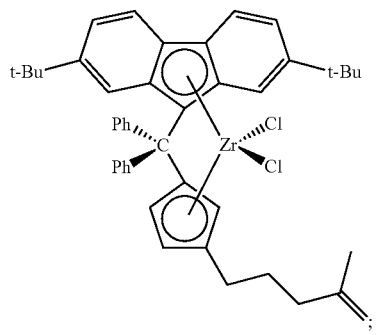
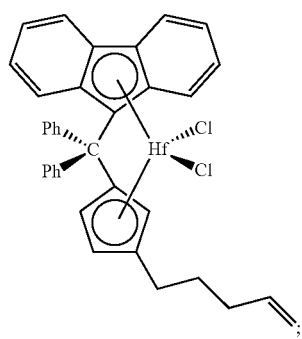
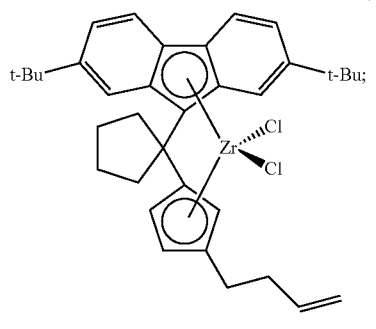
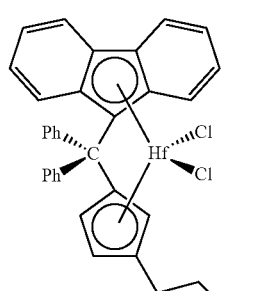
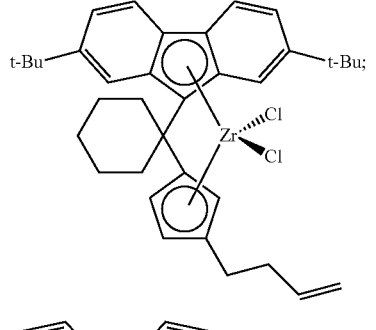
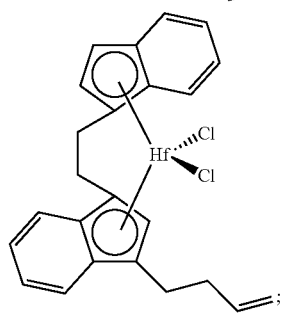
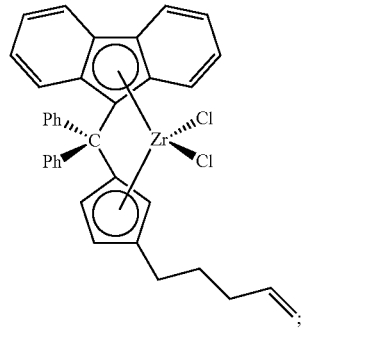
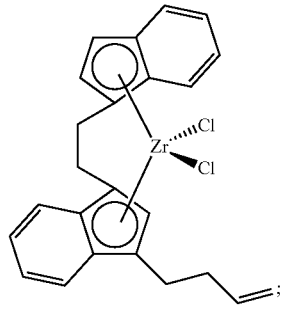

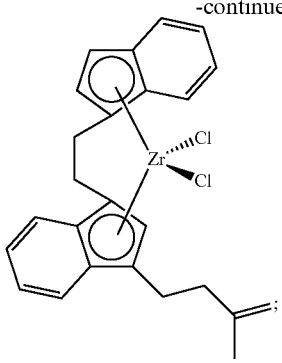
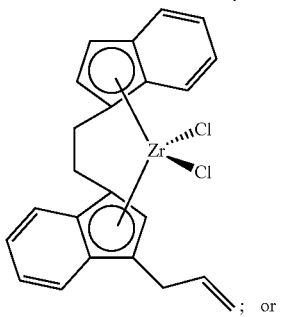
; or
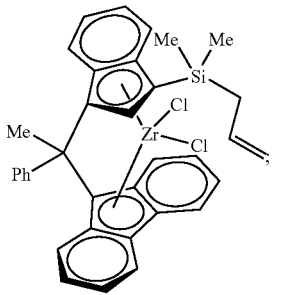
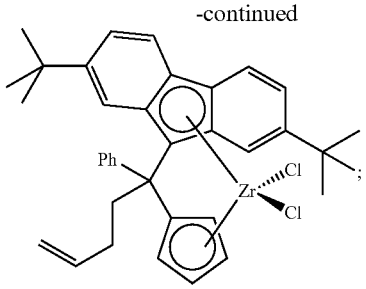
;
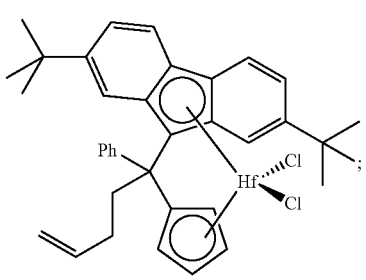
;
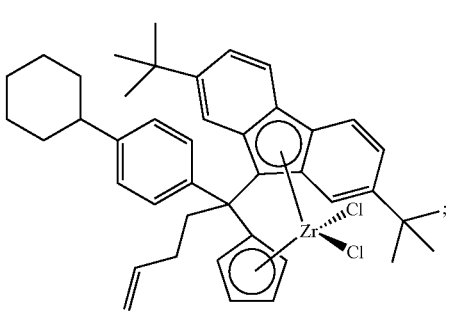
;
and the like. Applicants have used the abbreviations Ph for phenyl, Me for methyl, and t-Bu for tert-butyl.
The following representative bridged metallocene compounds also can be employed in catalyst compositions of the present invention:
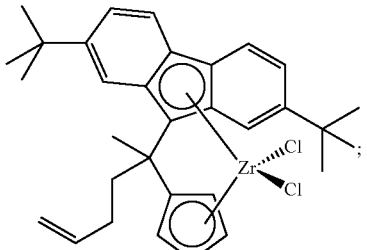
;
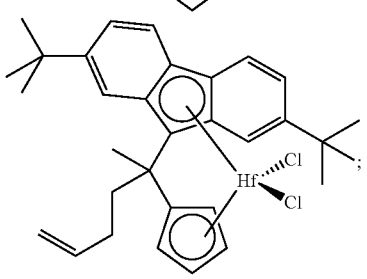
;
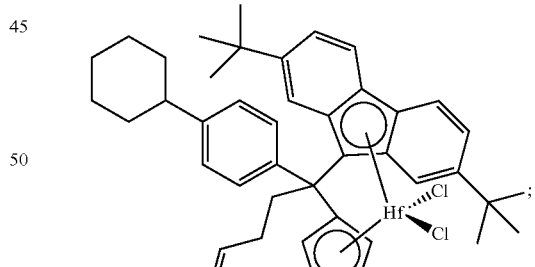
;
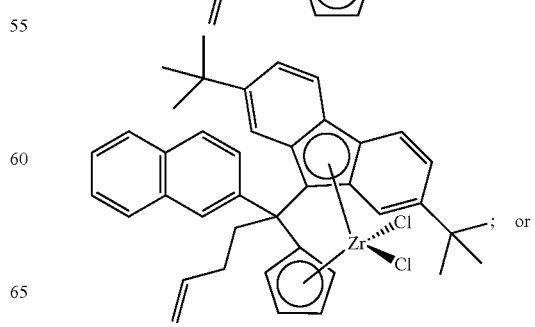
; or

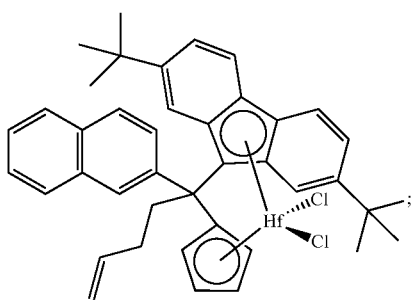
and the like.
Additional examples of bridged metallocene compounds that are suitable for use in catalyst compositions of the present invention are contemplated. These include, but are not limited to:
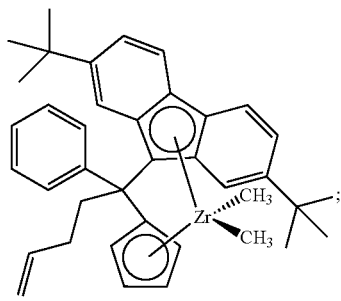
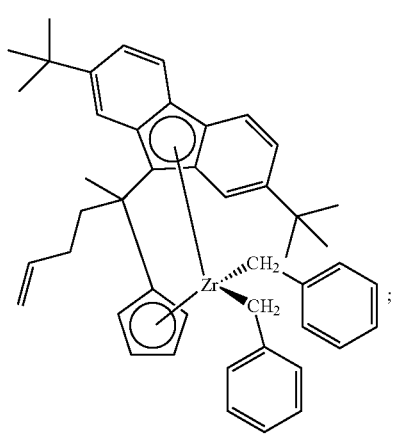
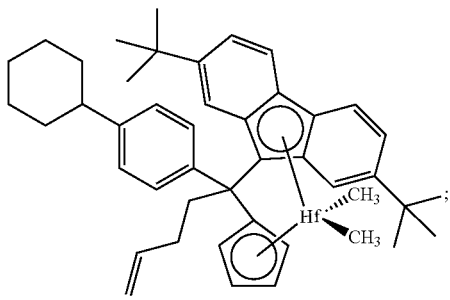
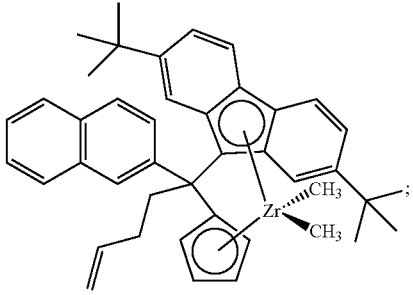
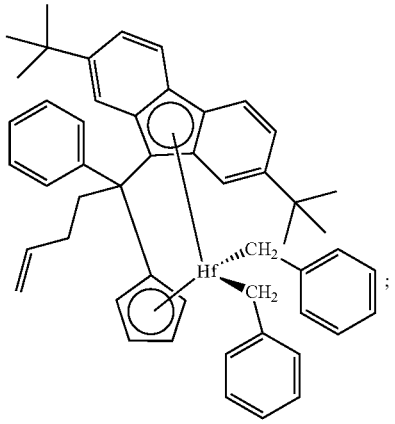
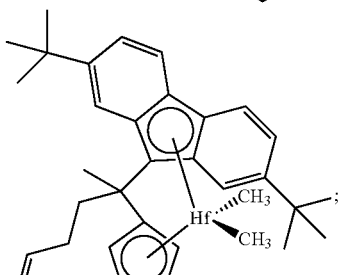
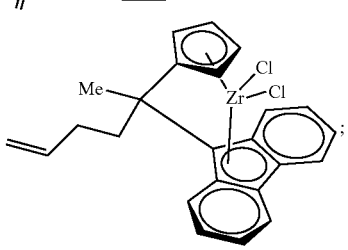
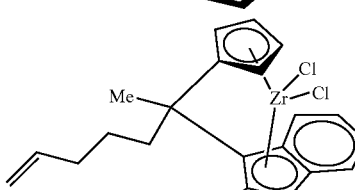

-continued
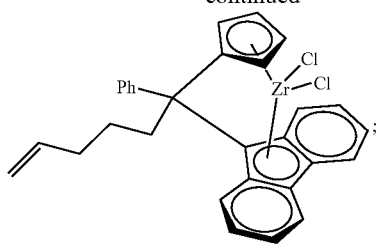
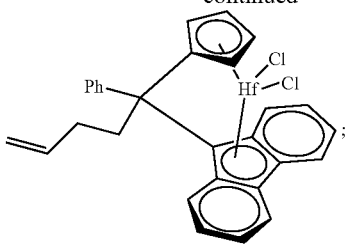
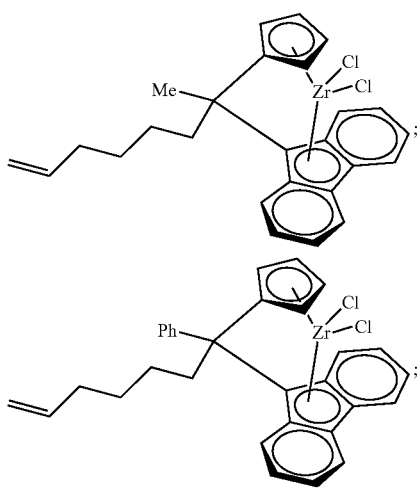
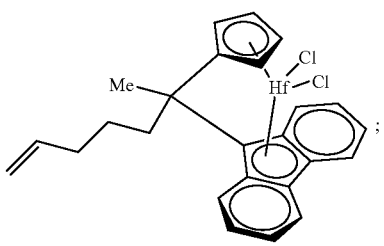
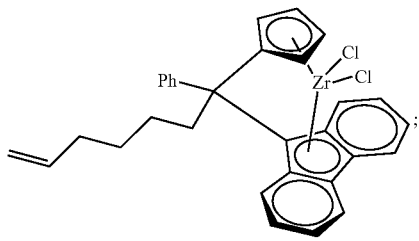
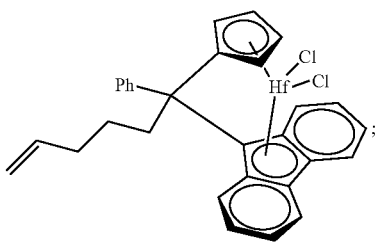
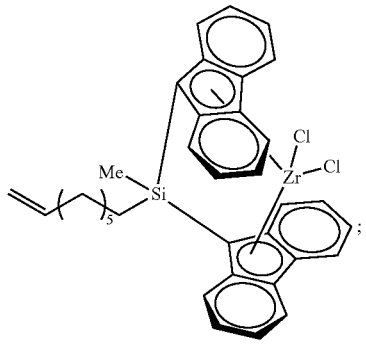
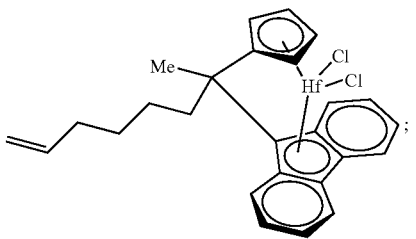
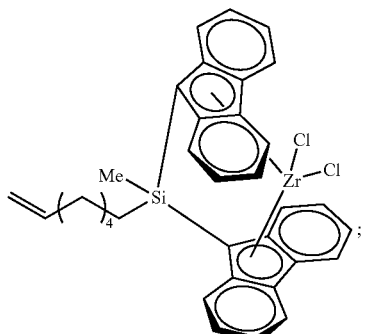
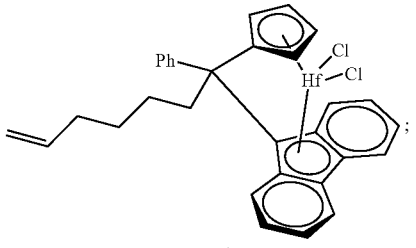
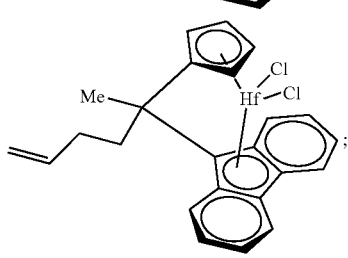
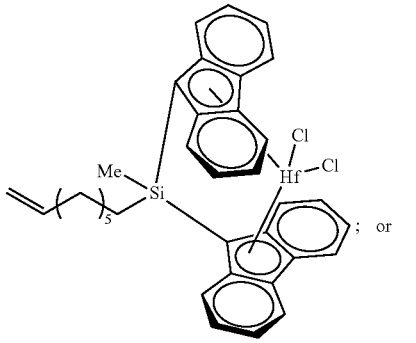

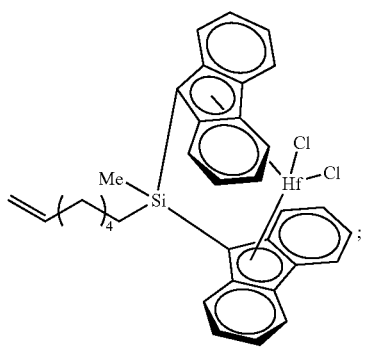
and the like.
The following non-limiting examples of two-carbon bridged metallocene compounds also can be used in catalyst compositions of the present invention:
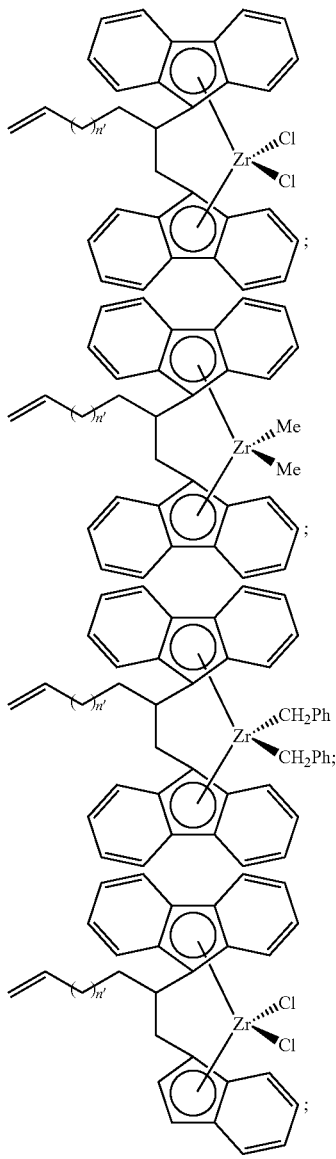
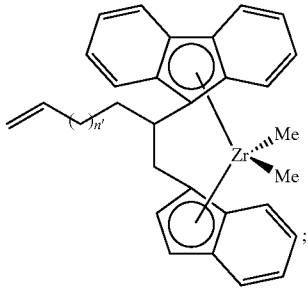
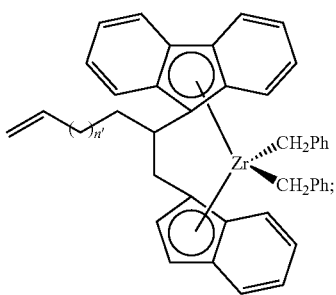
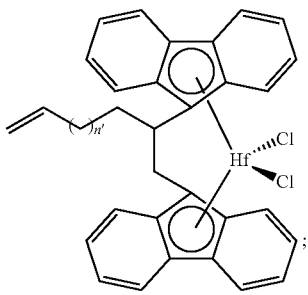
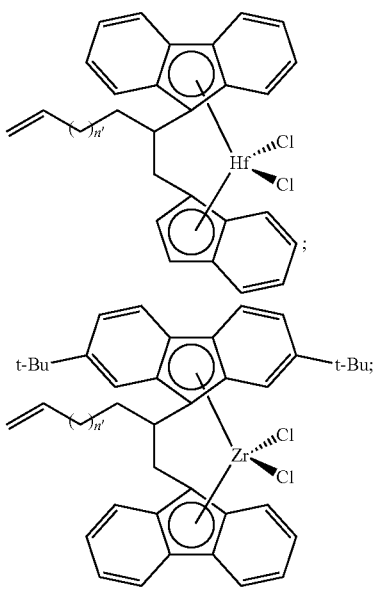

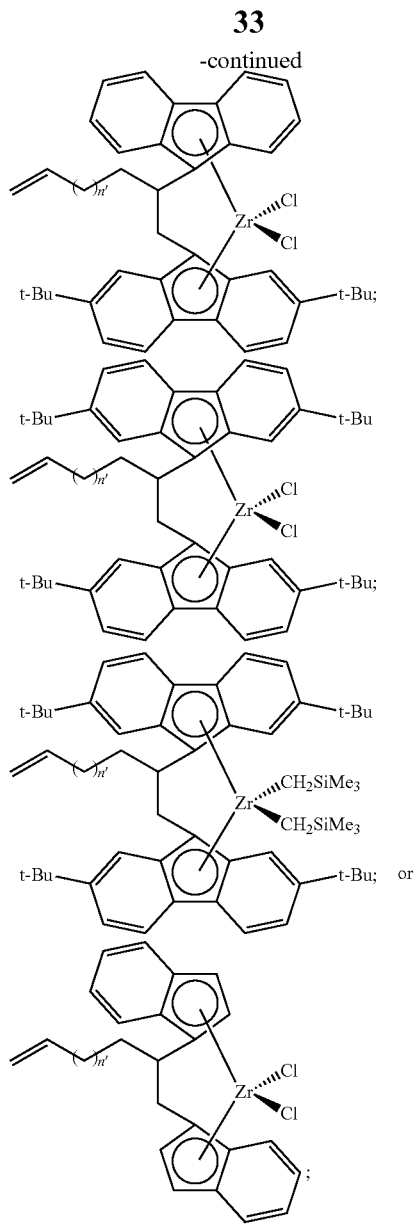

and the like. The integer n' in these metallocene compounds generally ranges from 0 to about 10, inclusive. For example, n' can be 1, 2, 3, 4, 5, 6, 7, or 8.

Other bridged metallocene compounds can be employed in catalyst compositions of the present invention. Therefore, the scope of the present invention is not limited to the bridged metallocene species provided above.

Likewise, unbridged metallocene compounds can be used in catalyst compositions of the present invention. Such compounds include, but are not limited to:

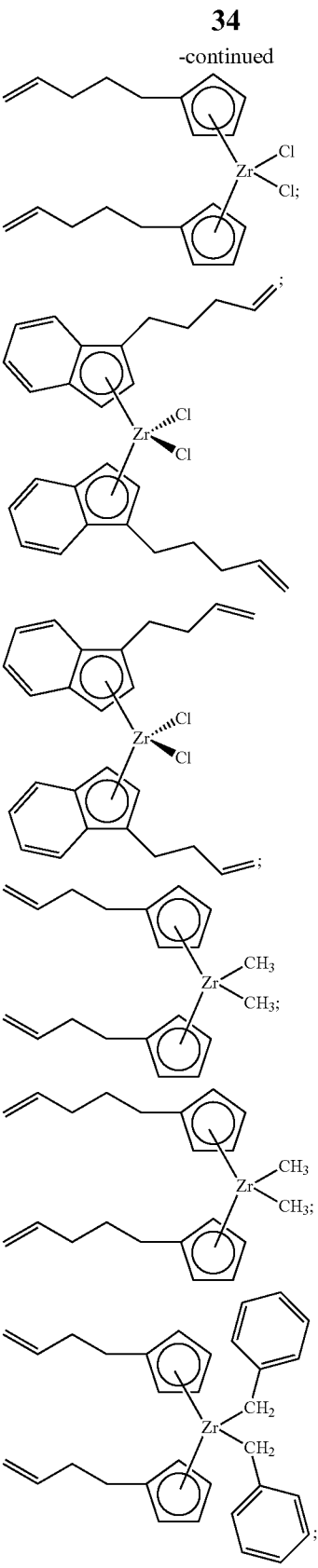

and the like.

Additional suitable unbridged metallocene compounds include, but are not limited to, the following compounds:

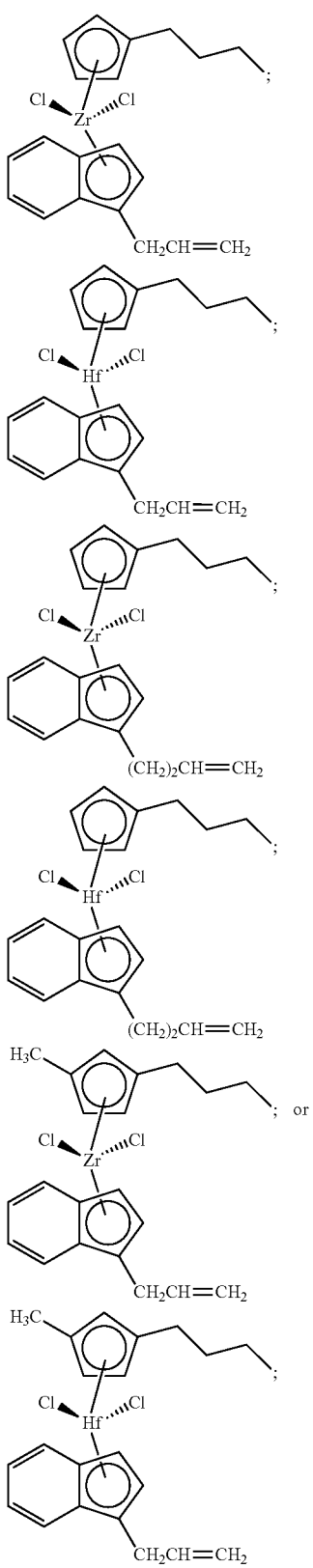

and the like.

Other unbridged metallocene compounds can be employed in catalyst compositions of the present invention.

Therefore, the scope of the present invention is not limited to the unbridged metallocene species provided above. Other metallocene compounds, including half-sandwich and cyclodienyl compounds, can be used in catalyst compositions of the present invention, and such compounds include, but are not limited to, the following:

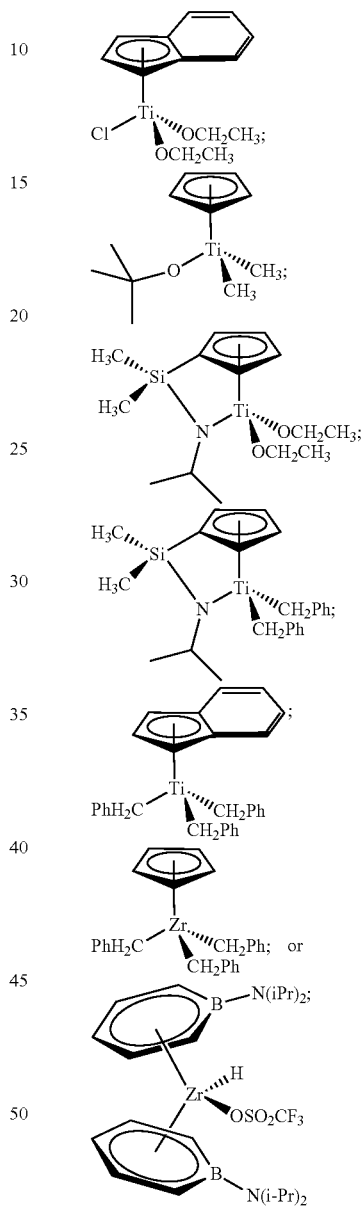

and the like, wherein i-Pr is an abbreviation for isopropyl.

Organoaluminum Compounds

In one aspect, catalyst compositions of the present invention can comprise organoaluminum compounds. Such compounds include, but are not limited to, compounds having the formula:

$$(R^1)_3Al;$$

where $R^1$ is an aliphatic group having from 2 to 10 carbon atoms. For example, $R^1$ can be ethyl, propyl, butyl, hexyl, or isobutyl.

Other organoaluminum compounds which can be used in catalyst compositions of this invention can include, but are not limited to, compounds having the formula:

$$Al(X^1)_m(X^2)_{3-m},$$

where $X^1$ is a hydrocarbyl; $X^2$ is an alkoxide or an aryloxide, a halide, or a hydride; and m is from 1 to 3, inclusive. The term "hydrocarbyl" is used herein to specify a hydrocarbon radical group and includes, but is not limited to, aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, or heteroatom substituted derivatives thereof.

In one aspect, $X^1$ is a hydrocarbyl having from 1 to about 20 carbon atoms. In another aspect of the present invention, $X^1$ is an alkyl having from 1 to 10 carbon atoms. For example, $X^1$ can be methyl, ethyl, propyl, n-butyl, sec-butyl, isobutyl, or hexyl, and the like, in yet another aspect of the present invention.

According to some aspects of the present invention, $X^2$ is an alkoxide or an aryloxide, any one of which has from 1 to 20 carbon atoms, a halide, or a hydride. In one aspect of the present invention, $X^2$ is selected independently from fluorine or chlorine. Yet, in another aspect, $X^2$ is chlorine.

In the formula, $Al(X^1)_m(X^2)_{3-m}$, is a number from 1 to 3, inclusive, and typically, m is 3. The value of m is not restricted to be an integer; therefore, this formula includes sesquihalide compounds or other organoaluminum cluster compounds.

Examples of organoaluminum compounds suitable for use in accordance with the present invention include, but are not limited to, trialkylaluminum compounds, dialkylaluminum halide compounds, dialkylaluminum alkoxide compounds, dialkylaluminum hydride compounds, and combinations thereof. Specific non-limiting examples of suitable organoaluminum compounds include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof.

The present invention contemplates a method of precontacting a metallocene or transition metal compound with an organoaluminum compound and an olefin monomer to form a precontacted mixture, prior to contacting this precontacted mixture with a calcined chemically-treated solid oxide to form a catalyst composition. When the catalyst composition is prepared in this manner, typically, though not necessarily, a portion of the organoaluminum compound is added to the precontacted mixture and another portion of the organoaluminum compound is added to the postcontacted mixture prepared when the precontacted mixture is contacted with the calcined chemically-treated solid oxide. However, the entire organoaluminum compound can be used to prepare the catalyst composition in either the precontacting or postcontacting step. Alternatively, all the catalyst components can be contacted in a single step.

Further, more than one organoaluminum compound can be used in either the precontacting or the postcontacting step. When an organoaluminum compound is added in multiple steps, the amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed regardless of whether a single organoaluminum compound or more than one organoaluminum compound is used.

Aluminoxane Compounds

The present invention contemplates a catalyst composition which can further comprise an aluminoxane compound. As used herein, the term "aluminoxane" refers to aluminoxane compounds, compositions, mixtures, or discrete species, regardless of how such aluminoxanes are prepared, formed, or otherwise provided. For example, a catalyst composition comprising an aluminoxane compound can be prepared in which aluminoxane is provided as the poly(hydrocarbyl aluminum oxide), or in which aluminoxane is provided as the combination of an aluminum alkyl compound and a source of active protons such as water. Aluminoxanes are also referred to as poly(hydrocarbyl aluminum oxides) or organoaluminoxanes.

The other catalyst components typically are contacted with the aluminoxane in a saturated hydrocarbon solvent, though any solvent that is substantially inert to the reactants, intermediates, and products of the activation step can be used. The catalyst composition formed in this manner is collected by any suitable method, for example, by filtration. Alternatively, the catalyst composition is introduced into the polymerization reactor without being isolated.

The aluminoxane compound of this invention can be an oligomeric aluminum compound comprising linear structures, cyclic structures, or cage structures, or mixtures of all three. Cyclic aluminoxane compounds having the formula:

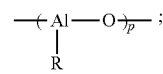

wherein R is a linear or branched alkyl having from 1 to 10 carbon atoms, and p is an integer from 3 to 20, are encompassed by this invention. The AlRO moiety shown here also constitutes the repeating unit in a linear aluminoxane. Thus, linear aluminoxanes having the formula:

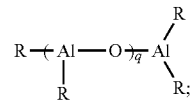

wherein R is a linear or branched alkyl having from 1 to 10 carbon atoms, and q is an integer from 1 to 50, are also encompassed by this invention.

Further, aluminoxanes can have cage structures of the formula $R^t_{5r+\alpha}R^b_{r-\alpha}Al_{4r}O_{3r}$, wherein $R^t$ is a terminal linear or branched alkyl group having from 1 to 10 carbon atoms; $R^b$ is a bridging linear or branched alkyl group having from 1 to 10 carbon atoms; r is 3 or 4; and a is equal to $n_{Al(3)} - n_{O(2)} + n_{O(4)}$, wherein $n_{Al(3)}$ is the number of three coordinate aluminum atoms, $n_{O(2)}$ is the number of two coordinate oxygen atoms, and $n_{O(4)}$ is the number of 4 coordinate oxygen atoms.

Thus, aluminoxanes which can be employed in the catalyst compositions of the present invention are represented generally by formulas such as $(R-Al-O)_p$, $R(R-Al-O)_q AlR_2$, and the like. In these formulas, the R group is typically a linear or branched $C_1$-$C_6$ alkyl, such as methyl, ethyl, propyl, butyl, pentyl, or hexyl. Examples of aluminoxane compounds that can be used with the present invention include, but are not limited to, methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentyl aluminoxane, 2-pentylaluminoxane, 3-pentyl-aluminoxane, isopentylaluminoxane, neopentylaluminoxane, and the like, or any combination thereof. Methylaluminoxane, ethylaluminoxane, and iso-butylaluminoxane are prepared from trimethylaluminum, triethylaluminum, or triisobutylaluminum, respectively, and sometimes are referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as that disclosed in U.S. Pat. No. 4,794,096, incorporated herein by reference in its entirety.

The present invention contemplates many values of p and q in the aluminoxane formulas $(R-Al-O)_p$ and $R(R-Al-O)_q AlR_2$, respectively. In some aspects, p and q are at least 3. However, depending upon how the organoaluminoxane is prepared, stored, and used, the value of p and q can vary within a single sample of aluminoxane, and such combinations of organoaluminoxanes are contemplated herein.

In preparing a catalyst composition containing an aluminoxane, the molar ratio of the total moles of aluminum in the aluminoxane (or aluminoxanes) to the total moles of metallocene or transition metal compound (or compounds) in the composition is generally between about 1:10 and about 100,000:1. In another aspect, the molar ratio is in a range from about 5:1 to about 15,000:1. Optionally, aluminoxane can be added to a polymerization zone in ranges from about 0.01 mg/L to about 1000 mg/L, from about 0.1 mg/L to about 100 mg/L, or from about 1 mg/L to about 50 mg/L.

Organoaluminoxanes can be prepared by various procedures. Examples of organoaluminoxane preparations are disclosed in U.S. Pat. Nos. 3,242,099 and 4,808,561, the disclosures of which are incorporated herein by reference in their entirety. For example, water in an inert organic solvent can be reacted with an aluminum alkyl compound, such as $(R^1)_3Al$, to form the desired organoaluminoxane compound. While not intending to be bound by this statement, it is believed that this synthetic method can afford a mixture of both linear and cyclic R—Al—O aluminoxane species, both of which are encompassed by this invention. Alternatively, organoaluminoxanes can be prepared by reacting an aluminum alkyl compound, such as $(R^1)_3Al$, with a hydrated salt, such as hydrated copper sulfate, in an inert organic solvent.

Organoboron/Organoborate Compounds

According to another aspect of the present invention, the catalyst composition can further comprise an organoboron or organoborate compound. Organoboron or organoborate compounds include neutral boron compounds, borate salts, and the like, or combinations thereof. For example, fluoroorgano boron compounds and fluoroorgano borate compounds are contemplated.

Any fluoroorgano boron or fluoroorgano borate compound can be utilized with the present invention. Examples of fluoroorgano borate compounds that can be used in the present invention include, but are not limited to, fluorinated aryl borates such as N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl)phenyl]borate, triphenylcarbenium tetrakis[3,5-bis(trifluoromethyl)phenyl]borate, and the like, or mixtures thereof. Examples of fluoroorgano boron compounds that can be used in the present invention include, but are not limited to, tris(pentafluorophenyl)boron, tris[3,5-bis(trifluoromethyl) phenyl]boron, and the like, or mixtures thereof. Although not intending to be bound by the following theory, these examples of fluoroorgano borate and fluoroorgano boron compounds, and related compounds, are thought to form "weakly-coordinating" anions when combined with organometal or metallocene compounds, as disclosed in U.S. Pat. No. 5,919,983, the disclosure of which is incorporated herein by reference in its entirety. Applicants also contemplate the use of diboron, or bis-boron, compounds or other bifunctional compounds containing two or more boron atoms in the chemical structure, such as disclosed in J. Am. Chem. Soc., 2005, 127, pp. 14756-14768, the content of which is incorporated herein by reference in its entirety.

Generally, any amount of organoboron compound can be used. According to one aspect of this invention, the molar ratio of the total moles of organoboron or organoborate compound (or compounds) to the total moles of metallocene or transition metal compound (or compounds) in the catalyst composition is in a range from about 0.1:1 to about 15:1. Typically, the amount of the fluoroorgano boron or fluoroorgano borate compound used is from about 0.5 moles to about 10 moles of boron/borate compound per mole of metallocene or transition metal compound. According to another aspect of this invention, the amount of fluoroorgano boron or fluoroorgano borate compound is from about 0.8 moles to about 5 moles of boron/borate compound per mole of metallocene or transition metal compound.

Ionizing Ionic Compounds

The present invention provides a catalyst composition which can further comprise an ionizing ionic compound. An ionizing ionic compound is an ionic compound that can function as an activator or co-catalyst to enhance the activity of the catalyst composition. While not intending to be bound by theory, it is believed that the ionizing ionic compound is capable of reacting with a metallocene compound and converting the metallocene into one or more cationic metallocene compounds, or incipient cationic metallocene compounds. Again, while not intending to be bound by theory, it is believed that the ionizing ionic compound can function as an ionizing compound by completely or partially extracting an anionic ligand, possibly a non-alkadienyl ligand from the metallocene. However, the ionizing ionic compound is an activator or co-catalyst regardless of whether it ionizes the metallocene, abstracts a ligand in a fashion as to form an ion pair, weakens the metal-ligand bond in the metallocene, simply coordinates to a ligand, or activates the metallocene compound by some other mechanism.

Further, it is not necessary that the ionizing ionic compound activate the metallocene compound(s) only. The activation function of the ionizing ionic compound can be evident in the enhanced activity of the catalyst composition as a whole, as compared to a catalyst composition that does not contain an ionizing ionic compound.

Examples of ionizing ionic compounds include, but are not limited to, the following compounds: tri(n-butyl)ammonium tetrakis(p-tolyl)borate, tri(n-butyl) ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethyl-phenyl)borate, N,N-dimethylanilinium tetrakis[3,5-bis (trifluoromethyl)phenyl]borate, N,N-dimethyl anilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl) borate, triphenylcarbenium tetrakis[3,5-bis(trifluoromethyl)phenyl]borate, triphenylcarbenium tetrakis (pentafluorophenyl)borate, tropylium tetrakis(p-tolyl) borate, tropylium tetrakis(m-tolyl)borate, tropylium tetrakis (2,4-dimethylphenyl)borate, tropylium tetrakis(3,5-dimethylphenyl)borate, tropylium tetrakis[3,5-bis(trifluoromethyl)phenyl]borate, tropylium tetrakis (pentafluorophenyl)borate, lithium tetrakis (pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis (m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetraphenylborate, potassium tetrakis(p-tolyl)borate, potassium tetrakis(m-tolyl)borate, potassium tetrakis(2, 4-dimethylphenyl)borate, potassium tetrakis(3,5-dimethylphenyl)borate, potassium tetrafluoroborate, lithium tetrakis-(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis (pentafluorophenyl)aluminate, sodium tetraphenylaluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl)aluminate, potassium tetrakis(2, 4-dimethylphenyl)aluminate, potassium tetrakis (3,5-dimethylphenyl)aluminate, potassium tetrafluoroaluminate, and the like, or combinations thereof. Ionizing ionic compounds useful in this invention are not limited to these; other examples of ionizing ionic compounds are disclosed in U.S. Pat. Nos. 5,576,259 and 5,807,938, the disclosures of which are incorporated herein by reference in their entirety.

Olefin Monomers

Unsaturated reactants that can be employed with catalyst compositions and polymerization processes of this invention typically include olefin compounds having from about 2 to 30 carbon atoms per molecule and having at least one olefinic double bond. This invention encompasses homopolymerization processes using a single olefin such as ethylene or propylene, as well as copolymerization, terpolymerization, etc., reactions with at least one different olefinic compound. For example, the resultant ethylene copolymers, terpolymers, etc., generally contain a major amount of ethylene (>50 mole percent) and a minor amount of comonomer (<50 mole percent), though this is not a requirement. Comonomers that can be copolymerized with ethylene often have from 3 to 20 carbon atoms in their molecular chain.

Acyclic, cyclic, polycyclic, terminal (α), internal, linear, branched, substituted, unsubstituted, functionalized, and non-functionalized olefins can be employed in this invention. For example, typical unsaturated compounds that can be polymerized with the catalyst compositions of this invention include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, the five normal decenes, and the like, or mixtures of two or more of these compounds. Cyclic and bicyclic olefins, including but not limited to, cyclopentene, cyclohexene, norbornylene, norbornadiene, and the like, can also be polymerized as described above. Styrene can also be employed as a monomer in the present invention.

When a copolymer (or alternatively, a terpolymer) is desired, the olefin monomer can comprise, for example, ethylene or propylene, which is copolymerized with at least one comonomer. According to one aspect of this invention, the olefin monomer in the polymerization process is ethylene. In this aspect, examples of suitable olefin comonomers include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to one aspect of the present invention, the comonomers comprise 1-butene, 1-pentene, 1-hexene, 1-octene, 1-decene, or styrene, or any combination thereof.

Generally, the amount of comonomer introduced into a reactor zone to produce the copolymer is from about 0.01 to about 50 weight percent of the comonomer based on the total weight of the monomer and comonomer. According to another aspect of the present invention, the amount of comonomer introduced into a reactor zone is from about 0.01 to about 40 weight percent comonomer based on the total weight of the monomer and comonomer. In still another aspect, the amount of comonomer introduced into a reactor zone is from about 0.1 to about 35 weight percent comonomer based on the total weight of the monomer and comonomer. Yet, in another aspect, the amount of comonomer introduced into a reactor zone is from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might. According to one aspect of the present invention, one monomer/reactant is ethylene, so the polymerizations are either a homopolymerization involving only ethylene, or copolymerizations with a different acyclic, cyclic, terminal, internal, linear, branched, substituted, or unsubstituted olefin. In addition, the catalyst compositions and processes of this invention can be used in the polymerization of diolefin compounds including, but not limited to, 1,3-butadiene, isoprene, 1,4-pentadiene, and 1,5-hexadiene.

Catalyst Compositions

Catalyst compositions of the present invention can comprise a contact product of:
 (i) a transition metal or metallocene compound;
 (ii) an organoaluminum compound; and
 (iii) a calcined chemically-treated solid oxide.

The calcined chemically-treated solid oxide can be prepared by any of the processes disclosed herein. For instance, calcined chemically-treated solid oxides can be produced using the continuous calcination vessel described above, and as exemplified in FIGS. 1-2. These catalyst compositions can be used to produce polyolefins, such as ethylene homopolymers, ethylene copolymers, and the like, for a variety of end-use applications. It is contemplated that the catalyst compositions of the present invention can contain more than one metallocene compound (or more than one transition metal compound, or a metallocene compound and a transition metal compound, etc.), as well as more than one calcined chemically-treated solid oxide. Additionally, more than one organoaluminum compound can be used.

In one aspect, the catalyst composition is substantially free of aluminoxanes, organoboron or organoborate compounds, and ionizing ionic compounds. In this aspect, the catalyst composition has catalyst activity, to be discussed below, in the absence of these additional materials. For instance, a catalyst composition can consist essentially of a metallocene compound, an organoaluminum compound, and a calcined chemically-treated solid oxide, wherein no other materials are present in the catalyst composition which would increase/decrease the activity of the catalyst composition more than about 10% from the catalyst activity of the catalyst composition in the absence of said materials.

This invention further encompasses methods of making catalyst compositions disclosed herein, such as contacting the respective catalyst components in any order or sequence. For example, a catalyst preparation system can be employed. Such a system can comprise:

(a) a metallocene or transition metal compound addition system configured to add a metallocene or transition metal compound to the catalyst preparation system at a controlled rate;

(b) a co-catalyst addition system configured to add a co-catalyst to the catalyst preparation system at a controlled rate;

(c) a continuous calcination vessel configured to add a calcined chemically-treated solid oxide to the catalyst preparation system at a controlled rate;

(d) a controller programmed with an algorithm to control the rate of addition of the metallocene or transition metal compound and the co-catalyst based on the rate of addition of the calcined chemically-treated solid oxide from the continuous calcination vessel.

This catalyst system also can comprise storage tanks, blending or mixing tanks, control valves, flow meters, pumps, and other process equipment that would be readily recognized by a skilled artisan. For instance, based on the rate of addition of the calcined chemically-treated solid oxide from the continuous calcination vessel into a catalyst mixing tank, the controller can alter the rate of addition of the metallocene (and/or transition metal) compound and/or the co-catalyst to coincide with a predetermined or desired ratio of the respective components. As an example, the weight ratio of the metallocene or transition metal compound to the calcined chemically-treated solid oxide can be controlled within a range from about 1:10 to about 1:10,000; and/or the weight ratio of the co-catalyst to the calcined chemically-treated solid oxide can be controlled within a range from about 10:1 to about 1:1000. The controller in the catalyst preparation system can be programmed with various algorithms to change and control the addition of the various components, and among these algorithms are neural networks, partial least squares, component regressions, first principles models, and the like.

In other aspects of the invention, the metallocene or transition metal compound can be precontacted with an olefin if desired, not necessarily the olefin monomer or comonomer to be copolymerized, and an organoaluminum compound for a first period of time prior to contacting this precontacted mixture with a calcined chemically-treated solid oxide. The first period of time for contact, the precontact time, between the metallocene or transition metal compound, the olefin, and the organoaluminum compound typically ranges from a time period of about 0.05 hours to about 24 hours, for example, from about 0.05 hours to about 1 hour. Precontact times from about 10 minutes to about 30 minutes are also employed.

In another aspect of the invention, the metallocene or transition metal compound can be precontacted with an olefinic monomer and a calcined chemically-treated solid oxide for a first period of time prior to contacting this precontacted mixture with an organoaluminum compound. The first period of time for contact, the precontact time, between the metallocene or transition metal compound, the olefinic monomer, and the calcined chemically-treated solid oxide typically ranges from a time period of about 0.05 hours to about 24 hours, for example, from about 0.05 hours to about 2 hours. Precontact times from about 10 minutes to about 60 minutes are also employed.

Alternatively, the precontacting process is carried out in multiple steps, rather than a single step, in which multiple mixtures are prepared, each comprising a different set of catalyst components. For example, at least two catalyst components are contacted forming a first mixture, followed by contacting the first mixture with at least one other catalyst component forming a second mixture, and so forth.

Multiple precontacting steps can be carried out in a single vessel or in multiple vessels. Further, multiple precontacting steps can be carried out in series (or sequentially), in parallel, or a combination thereof. For example, a first mixture of two catalyst components can be formed in a first vessel, a second mixture comprising the first mixture plus one additional catalyst component can be formed in the first vessel or in a second vessel, which is typically placed downstream of the first vessel.

In another aspect, one or more of the catalyst components can be split and used in different precontacting treatments. For example, part of a catalyst component is fed into a first precontacting vessel for precontacting with at least one other catalyst component, while the remainder of that same catalyst component is fed into a second precontacting vessel for precontacting with at least one other catalyst component, or is fed directly into the reactor, or a combination thereof. The precontacting can be carried out in any suitable equipment, such as tanks, stirred mix tanks, various static mixing devices, a flask, a vessel of any type, or combinations of these apparatus.

In another aspect of this invention, the various catalyst components (for example, metallocene or transition metal compound, calcined chemically-treated solid oxide, organoaluminum co-catalyst, and optionally an unsaturated hydrocarbon) are contacted in the polymerization reactor simultaneously while the polymerization reaction is proceeding. Alternatively, any two or more of these catalyst components can be precontacted in a vessel prior to entering the reaction zone. This precontacting step can be continuous, in which the precontacted product is fed continuously to the reactor, or it can be a stepwise or batchwise process in which a batch of precontacted product is added to make a catalyst composition. This precontacting step can be carried out over a time period that can range from a few seconds to as much as several days, or longer. In this aspect, the continuous precontacting step generally lasts from about 1 second to about 1 hour. In another aspect, the continuous precontacting step lasts from about 10 seconds to about 45 minutes, or from about 1 minute to about 30 minutes.

Once a precontacted mixture of a metallocene or transition metal compound, olefin monomer, and organoaluminum co-catalyst is contacted with a calcined chemically-treated solid oxide, this composition (with the addition of the calcined chemically-treated solid oxide) is termed a "postcontacted mixture." The postcontacted mixture optionally remains in contact for a second period of time, the postcontact time, prior to initiating the polymerization process. Postcontact times between the precontacted mixture and the calcined chemically-treated solid oxide generally range from about 1 minute to about 24 hours. In a further aspect, the postcontact time is in a range from about 0.05 hours to about 1 hour. The precontacting step, the postcontacting step, or both, can increase the productivity of the polymer as compared to the same catalyst composition that is prepared without precontacting or postcontacting. However, neither a precontacting step nor a postcontacting step is required.

The postcontacted mixture can be heated at a temperature and for a time period sufficient to allow adsorption, impregnation, or interaction of precontacted mixture and the calcined chemically-treated solid oxide, such that a portion of the components of the precontacted mixture is immobilized, adsorbed, or deposited thereon. Where heating is employed, the postcontacted mixture generally is heated to a temperature of from between about 0° F. to about 150° F., or from about 40° F. to about 95° F.

According to one aspect of this invention, the molar ratio of the moles of metallocene or transition metal compound to the moles of organoaluminum compound in a catalyst composition generally is in a range from about 1:1 to about 1:10,000. In another aspect, the molar ratio is in a range from about 1:1 to about 1:1,000. Yet, in another aspect, the molar ratio of the moles of metallocene or transition metal compound to the moles of organoaluminum compound is in a range from about 1:1 to about 1:100. These molar ratios reflect the ratio of total moles of metallocene compound (or compounds, including transition metal compounds) to the total amount of organoaluminum compound (or compounds) in both the precontacted mixture and the postcontacted mixture combined, if precontacting and/or postcontacting steps are employed.

When a precontacting step is used, the molar ratio of the total moles of olefin monomer to total moles of metallocene or transition metal compound in the precontacted mixture is typically in a range from about 1:10 to about 100,000:1. Total moles of each component are used in this ratio to account for aspects of this invention where more than one olefin monomer and/or more than metallocene compound (or a transition metal compound or compounds, or both a metallocene compound and a transition metal compound, etc.) is employed. Further, this molar ratio can be in a range from about 10:1 to about 1,000:1 in another aspect of the invention.

Generally, the weight ratio of organoaluminum compound to calcined chemically-treated solid oxide is in a range from about 10:1 to about 1:1000. If more than one organoaluminum compound and/or more than one calcined chemically-treated solid oxide is employed, this ratio is based on the total weight of each respective component. In another aspect, the weight ratio of the organoaluminum compound to the calcined chemically-treated solid oxide is in a range from about 3:1 to about 1:100, or from about 1:1 to about 1:50.

In some aspects of this invention, the weight ratio of metallocene or transition metal compound to calcined chemically-treated solid oxide is in a range from about 1:1 to about 1:1,000,000. If more than one metallocene or transition metal compound and/or more than one calcined chemically-treated solid oxide is employed, this ratio is based on the total weight of each respective component. In another aspect, this weight ratio is in a range from about 1:5 to about 1:100,000, or from about 1:10 to about 1:10,000. Yet, in another aspect, the weight ratio of the metallocene or transition metal compound to the calcined chemically-treated solid oxide is in a range from about 1:20 to about 1:1000.

According to some aspects of this invention, aluminoxane compounds are not required to form the catalyst composition. Thus, the polymerization can proceed in the absence of aluminoxanes. Accordingly, the present invention can use, for example, organoaluminum compounds and a calcined chemically-treated solid oxide in the absence of aluminoxanes. While not intending to be bound by theory, it is believed that the organoaluminum compound likely does not activate the metallocene catalyst in the same manner as an organoaluminoxane compound.

Additionally, in some aspects, organoboron and organoborate compounds are not required to form a catalyst composition of this invention. Nonetheless, aluminoxanes, organoboron or organoborate compounds, ionizing ionic compounds, or combinations thereof, can be used in other catalyst compositions contemplated by and encompassed within the present invention. Hence, aluminoxanes, organoboron or organoborate compounds, ionizing ionic compounds, or combinations thereof, can be employed as optional components with the metallocene or transition metal compound and the calcined chemically-treated solid oxide, for example, either in the presence or in the absence of an organoaluminum compound.

Catalyst compositions of the present invention generally have a catalyst activity greater than about 100 grams of polyethylene (homopolymer, copolymer, etc., as the context requires) per gram of calcined chemically-treated solid oxide per hour (abbreviated gPE/(gCTSO·hr)). In another aspect, the catalyst activity is greater than about 250, greater than about 500, or greater than about 750 gPE/(gCTSO·hr). In still another aspect, catalyst compositions of this invention are characterized by having a catalyst activity greater than about 1000, greater than about 2000, or greater than about 2500 gPE/(gCTSO·hr). Yet, in another aspect, the catalyst activity is greater than about 5000 gPE/(gCTSO·hr). This activity is measured under slurry polymerization conditions using isobutane as the diluent, at a polymerization temperature of about 90° C. and a reactor pressure of about 450 psig.

As discussed above, any combination of the metallocene or transition metal compound, the calcined chemically-treated solid oxide, the organoaluminum compound, and the olefin monomer, can be precontacted in some aspects of this invention. When any precontacting occurs with an olefinic monomer, it is not necessary that the olefin monomer used in the precontacting step be the same as the olefin to be copolymerized. Further, when a precontacting step among any combination of the catalyst components is employed for a first period of time, this precontacted mixture can be used in a subsequent postcontacting step between any other combination of catalyst components for a second period of time. For example, a metallocene compound, an organoaluminum compound, and 1-hexene can be used in a precontacting step for a first period of time, and this precontacted mixture then can be contacted with a calcined chemically-treated solid oxide to form a postcontacted mixture that is contacted for a second period of time prior to initiating the polymerization reaction. For example, the first period of time for contact, the precontact time, between any combination of the metallocene compound, the olefinic monomer, the calcined chemically-treated solid oxide, and the organoaluminum compound can be from about 0.05 hours to about 24 hours, from about 0.05 hours to about 1 hour, or from about 10 minutes to about 30 minutes. The postcontacted mixture optionally is allowed to remain in contact for a second period of time, the postcontact time, prior to initiating the polymerization process. According to one aspect of this invention, postcontact times between the precontacted mixture and any remaining catalyst components is from about 1 minute to about 24 hours, or from about 0.1 hour to about 1 hour.

Polymerization Process

Catalyst compositions of the present invention can be used to polymerize olefins to form homopolymers, copolymers, terpolymers, and the like. One such process for polymerizing olefins in the presence of a catalyst composition comprises contacting the catalyst composition with an olefin monomer and optionally an olefin comonomer under polymerization conditions to produce an olefin polymer.

Olefin polymerization processes disclosed herein can be conducted using various types of polymerization reactors. As used herein, "polymerization reactor" includes any polymerization reactor capable of polymerizing olefin monomers and comonomers (one or more than one comonomer) to produce homopolymers, copolymers, terpolymers, and the like. The various types of reactors include those that may be referred to as batch, slurry, gas phase, solution, high pressure, tubular, or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of unreacted monomer, unreacted comonomer, and/or diluent.

Polymerization reactor systems of the present invention may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas phase reactors, a combination of loop and gas phase reactors, multiple high pressure reactors, or a combination of high pressure with loop and/or gas phase reactors. The multiple reactors may be operated in series or in parallel.

According to one aspect of the invention, the polymerization reactor system may comprise at least one loop slurry reactor comprising vertical or horizontal loops. Monomer, diluent, catalyst, and optionally any comonomer may be continuously fed to a loop reactor where polymerization occurs. Generally, continuous processes may comprise the continuous introduction of monomer/comonomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this invention, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another aspect of the invention, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the invention, the polymerization reactor may comprise a solution polymerization reactor wherein the monomer/comonomer are contacted with the catalyst composition by suitable stirring or other means. A carrier comprising an inert organic diluent or excess monomer may be employed. If desired, the monomer/comonomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present invention may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide desired polymer properties include temperature, pressure, and the concentrations of various reactants. Polymerization temperature can affect catalyst productivity, polymer molecular weight, and molecular weight distribution. Suitable polymerization temperature may be any temperature below the de-polymerization temperature according to the Gibbs Free energy equation. Typically, this includes from about 60° C. to about 280° C., for example, or from about 60° C. to about 110° C., depending upon the type of polymerization reactor. In some reactor systems, the polymerization temperature generally is within a range from about 70° C. to about 90° C., or from about 75° C. to about 85° C.

Suitable pressures will also vary according to the reactor and polymerization type. The pressure for liquid phase polymerizations in a loop reactor is typically less than 1000 psig. Pressure for gas phase polymerization is usually at about 200 to 500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of the reactant entering the polymerization reactor can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

Polymers and Articles

This invention is also directed to the polymers produced by any of the polymerization processes disclosed herein. Articles of manufacture can be formed from, and can comprise, the polymers produced in accordance with this invention.

If the resultant polymer produced in accordance with the present invention is, for example, a polymer or copolymer of ethylene, its properties can be characterized by various analytical techniques known and used in the polyolefin industry. Articles of manufacture can be formed from, and can comprise, the ethylene polymers of this invention, whose typical properties are provided below.

Polymers of ethylene (homopolymers, copolymers, terpolymers, etc.) produced in accordance with this invention generally have a melt index from about 0.01 to about 100 g/10 min. Melt indices in the range from about 0.1 to about 50 g/10 min, or from about 0.3 to about 20 g/10 min, are contemplated in some aspects of this invention. For example, a polymer of the present invention can have a melt index in a range from about 0.5 to about 10, or from about 0.5 to about 6 g/10 min.

The density of ethylene-based polymers produced using catalyst compositions disclosed herein typically falls within the range from about 0.87 to about 0.97 g/cm$^3$. In one aspect of this invention, the density of an ethylene polymer is in a range from about 0.89 to about 0.96 g/cm$^3$. Yet, in another aspect, the density is in a range from about 0.90 to about 0.95 g/cm$^3$, such as, for example, from about 0.91 to about 0.94 g/cm$^3$.

Polymers of ethylene can be formed into various articles of manufacture. Articles which can comprise polymers of this invention include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

The sulfated alumina employed in the Examples was prepared in accordance with the following procedure. Bohemite was obtained from W.R. Grace Company under the designation "Alumina A" and having a surface area of about 300 m$^2$/g and a pore volume of about 1.3 mL/g. This material was obtained as a powder having an average particle size of about 100 microns. This material was impregnated to incipient wetness with an aqueous solution of ammonium sulfate to equal about 15% sulfate. This mixture was then placed in a flat pan and allowed to dry under vacuum at approximately 110° C. for about 16 hours.

To calcine the chemically-treated solid oxide, about 10 grams of this powdered mixture were placed in a 1.75-inch quartz tube fitted with a sintered quartz disk at the bottom. While the powder was supported on the disk, air dried by passing through a 13× molecular sieve column, was blown upward through the disk at the linear rate of about 1.6 to 1.8 standard cubic feet per hour. An electric furnace around the quartz tube was employed to control the desired calcining temperature. At the respective calcination temperature, the powder was allowed to fluidize in the dry air for the desired calcination time. Afterward, the sulfated alumina (calcined chemically-treated solid oxide) was collected and stored under dry nitrogen, and was used without exposure to the atmosphere.

The polymerization runs were conducted in a one-gallon (3.8-liter) stainless steel reactor as follows. First, the reactor was purged with nitrogen and then with isobutane vapor.

About 0.5 mL of 1M triisobutylaluminum (TIBA) organo-aluminum co-catalyst, 100 mg of sulfated alumina, and about 3.4 mg of the metallocene compound shown below were added in that order through a charge port while venting isobutane vapor.

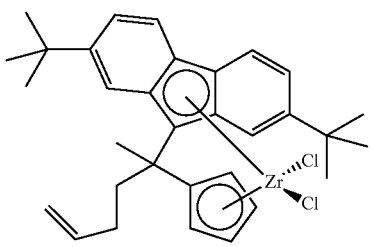

The metallocene compound was added from a 1 mg/mL solution prepared by dissolving 20 mg of the metallocene in 20 mL of toluene. The charge port was closed and 1.8 L of isobutane were added. Then, 40 g of 1-hexene were added and the contents of the reactor were stirred and heated to a polymerization temperature of 80° C. Ethylene was then introduced and the total reactor pressure was maintained at 450 psig for the duration of the polymerization. The contents of the reactor were maintained at the polymerization temperature for 30 minutes by an automated heating-cooling system.

Examples 1-5

Effect of Calcination Time on Polymerization Activity

At a calcination temperature of 600° C., the calcination time of sulfated alumina was varied from 15 minutes to 6 hours in Examples 1-5. Table I summarizes the catalyst activity for Examples 1-5, measured in grams of polymer produced per gram of calcined chemically-treated solid oxide per hour.

TABLE I

Catalyst Activity and Calcination Time for Examples 1-5.

| Example | Calcination Time | Catalyst Activity |
| --- | --- | --- |
| 1 | 15 min | 7020 |
| 2 | 30 min | 7663 |
| 3 | 1 hr | 7298 |
| 4 | 3 hr | 6909 |
| 5 | 6 hr | 8211 |

Examples 6-9

Effect of Calcination Time on Polymerization Activity

At a calcination temperature of 600° C., the calcination time of sulfated alumina was varied from 2 to 6 hours in Examples 6-9. Table II summarizes the catalyst activity for Examples 6-9, measured in grams of polymer produced per gram of calcined chemically-treated solid oxide per hour. Example 6 was conducted in the same manner as Examples 1-5. Examples 7-9 were calcined in the manner described above, but in a larger batch calcination vessel.

TABLE II

Catalyst Activity and Calcination Time for Examples 6-9.

| Example | Calcination Time | Catalyst Activity |
| --- | --- | --- |
| 6 | 6 hr | 8884 |
| 7 | 2 hr | 8000 |
| 8 | 4 hr | 8667 |
| 9 | 6 hr | 10000 |

Examples 10-13

Effect of the Selection of the First Agent or Fluidizing Gas on Polymerization Activity At a calcination temperature of 600° C. and calcination time of 3 hours, the selection of the first agent or fluidizing gas employed for the calcination was varied in Examples 10-13. In the calcination procedure above, either air, dry nitrogen, wet nitrogen, or carbon monoxide was used to fluidize the powdered chemically-treated solid oxide. Dry nitrogen was used as the second agent to purge the sulfated-alumina (calcined chemically-treated solid oxide). Table III summarizes the catalyst activity for Examples 10-13, measured in grams of polymer produced per gram of calcined chemically-treated solid oxide per hour. Examples 10-13 were conducted in the same manner as Examples 1-5.

TABLE III

Catalyst Activity and Fluidizing Gas for Examples 10-13.

| Example | Fluidizing Gas | Catalyst Activity |
| --- | --- | --- |
| 10 | Air | 9609 |
| 11 | Dry Nitrogen | 9039 |
| 12 | Wet Nitrogen | 9508 |
| 13 | Carbon Monoxide | 593 |

We claim:
1. A continuous calcination vessel comprising:
(a) a fluidized bed vessel comprising at least one zone dividing wall for dividing the fluidized bed into a plurality of heating zones capable of independent temperature control and independent fluidizing gas control;
(b) a particulate material inlet capable of introducing inlet particulate material into the fluidized bed vessel;
(c) a fluidizing gas inlet capable of introducing a fluidizing gas into the fluidized bed vessel;
(d) a fluidizing gas path capable of directing the fluidizing gas from the fluidizing gas inlet into the fluidized bed vessel to fluidize the inlet particulate material; and
(e) an outlet capable of removing outlet particulate material from the fluidized bed vessel; wherein:
each heating zone comprises at least one baffle;
the fluidized bed vessel contains sufficient baffles to cause a substantially plug flow profile through the fluidized bed vessel; and
the fluidized bed vessel has a slope from horizontal of less than about 15 degrees.
2. The continuous calcination vessel of claim 1, wherein the inlet particulate material comprises a solid oxide, a chemically-treated solid oxide, or a combination thereof.
3. The continuous calcination vessel of claim 1, wherein the outlet particulate material comprises a calcined chemically-treated solid oxide.

4. The continuous calcination vessel of claim 1, wherein each baffle contains apertures located on alternating opposite edges of the baffles to cause a serpentine flow profile through the fluidized bed vessel.

5. The continuous calcination vessel of claim 1, wherein the fluidizing gas inlet comprises a gas distributor plate, nozzle, hole, screen, dispensing head, or any combination thereof.

6. The continuous calcination vessel of claim 1, wherein the fluidized bed vessel comprises a first heating zone and a second heating zone, wherein:
the fluidizing gas in the first heating zone comprises air, nitrogen, argon, hydrogen, oxygen, carbon monoxide, water, or any combination thereof; and
the fluidizing gas in the second heating zone comprises helium, neon, argon, nitrogen, or any combination thereof.

7. The continuous calcination vessel of claim 1, wherein the fluidized bed vessel has a slope from horizontal of less than about 10 degrees.

8. The continuous calcination vessel of claim 1, wherein the fluidized bed vessel has a slope from horizontal of less than about 5 degrees.

9. The continuous calcination vessel of claim 1, wherein the continuous calcination vessel is further configured to reduce a residual oxygen content of the outlet particulate material to less than about 100 ppm, a residual moisture content of the outlet particulate oxide to less than about 100 ppm, or a combination thereof.

10. A continuous calcination vessel comprising:
(a) a fluidized bed vessel comprising at least one zone dividing wall for dividing the fluidized bed into a plurality of heating zones capable of independent temperature control and independent fluidizing gas control;
(b) a particulate material inlet capable of introducing inlet particulate material into the fluidized bed vessel;
(c) a fluidizing gas inlet capable of introducing a fluidizing gas into the fluidized bed vessel;
(d) a fluidizing gas path capable of directing the fluidizing gas from the fluidizing gas inlet into the fluidized bed vessel to fluidize the inlet particulate material;
(e) an outlet capable of removing outlet particulate material from the fluidized bed vessel; and
(f) a filter apparatus adapted to remove a portion of the inlet particulate material, the outlet particulate material, or both, entrained in the fluidizing gas;
wherein the fluidized bed vessel has a slope from horizontal of less than about 15 degrees.

11. The continuous calcination vessel of claim 10, wherein the filter apparatus is further configured to recycle a filtered portion of the inlet particulate material, the outlet particulate material, or both, back to the same or an upstream location in the continuous calcination vessel, wherein less than 1% by weight of the respective inlet particulate material, outlet particulate material, or both, is lost overhead.

12. The continuous calcination vessel of claim 10, wherein the fluidized bed vessel comprises a first heating zone and a second heating zone, wherein:
the fluidizing gas in the first heating zone comprises air, nitrogen, argon, hydrogen, oxygen, carbon monoxide, water, or any combination thereof; and
the fluidizing gas in the second heating zone comprises helium, neon, argon, nitrogen, or any combination thereof.

13. The continuous calcination vessel of claim 10, wherein the fluidizing gas inlet comprises a gas distributor plate, nozzle, hole, screen, dispensing head, or any combination thereof.

14. The continuous calcination vessel of claim 10, wherein the fluidized bed vessel has a slope from horizontal of less than about 10 degrees.

15. The continuous calcination vessel of claim 10, wherein the fluidized bed vessel has a slope from horizontal of less than about 5 degrees.

16. A continuous calcination vessel comprising:
(a) a fluidized bed vessel comprising at least one zone dividing wall for dividing the fluidized bed into a plurality of heating zones capable of independent temperature control and independent fluidizing gas control;
(b) a particulate material inlet capable of introducing inlet particulate material into the fluidized bed vessel;
(c) a fluidizing gas inlet capable of introducing a fluidizing gas into the fluidized bed vessel;
(d) a fluidizing gas path capable of directing the fluidizing gas from the fluidizing gas inlet into the fluidized bed vessel to fluidize the inlet particulate material;
(e) an outlet capable of removing outlet particulate material from the fluidized bed vessel; and
(f) a cooling system downstream of the outlet of the fluidized bed vessel;
wherein the fluidized bed vessel has a slope from horizontal of less than about 15 degrees.

17. The continuous calcination vessel of claim 16, wherein the cooling system further comprises:
a fluidizing cooling gas inlet capable of introducing a fluidizing cooling gas into the cooling system;
a fluidizing cooling gas path capable of directing the fluidizing cooling gas from the fluidizing gas inlet into the cooling system to fluidize the outlet particulate material; and
a filter apparatus adapted to remove a portion of the outlet particulate material entrained in the fluidizing cooling gas.

18. The continuous calcination vessel of claim 16, wherein the outlet particulate material comprises a calcined chemically-treated solid oxide.

19. The continuous calcination vessel of claim 16, wherein the fluidized bed vessel has a slope from horizontal of less than about 10 degrees.

20. The continuous calcination vessel of claim 16, wherein the fluidized bed vessel has a slope from horizontal of less than about 5 degrees.

* * * * *